US008651564B2

(12) United States Patent
Fujii et al.

(10) Patent No.: US 8,651,564 B2
(45) Date of Patent: Feb. 18, 2014

(54) POLYGONAL CROSS-SECTIONAL FRAME, AND REAR VEHICLE BODY STRUCTURE

(75) Inventors: Takayuki Fujii, Wako (JP); Masayo Akiyama, Wako (JP); Seiji Hayashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 263 days.

(21) Appl. No.: 13/091,231

(22) Filed: Apr. 21, 2011

(65) Prior Publication Data

US 2011/0260503 A1    Oct. 27, 2011

(30) Foreign Application Priority Data

Apr. 23, 2010  (JP) ................................. 2010-099676
Apr. 23, 2010  (JP) ................................. 2010-099752

(51) Int. Cl.
    *B60J 9/00*    (2006.01)
(52) U.S. Cl.
    USPC ................................ 296/203.04; 296/187.11
(58) Field of Classification Search
    USPC ........................................ 296/203.04, 187.11
    See application file for complete search history.

(56) References Cited

U.S. PATENT DOCUMENTS 5,213,386 A * 5/1993 Janotik et al. .................... 296/29
6,092,865 A * 7/2000 Jaekel et al. .................. 296/205
6,293,618 B1 * 9/2001 Sukegawa et al. ............ 296/209

FOREIGN PATENT DOCUMENTS

JP        09-309455      12/1997
JP        2004-148981    5/2004

* cited by examiner

*Primary Examiner* — Joseph Pape
(74) *Attorney, Agent, or Firm* — Rankin, Hill & Clark LLP

(57) ABSTRACT

A polygonal cross-sectional frame has an L closed cross-sectional shape such that the frame has an inwardly recessed section. A rear vehicle body structure includes a depressing member provided, along the lower surface of a rear frame extending rearward from a floor of a passenger compartment, in opposed relation to a predetermined vehicle-body-mounted component part disposed beneath the depressing member. As a rear section of the rear frame deforms due to a load input to the rear end of the rear frame, the depressing member deforms downward to depress and displace the predetermined vehicle-body-mounted component part.

5 Claims, 29 Drawing Sheets

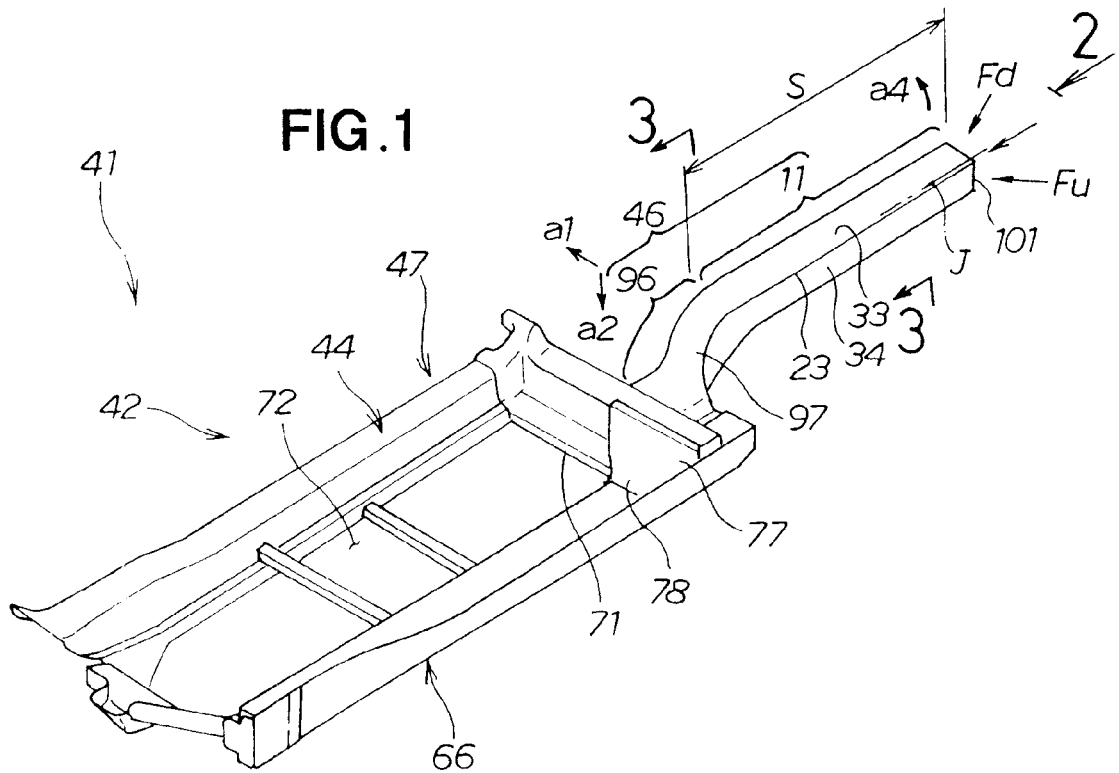
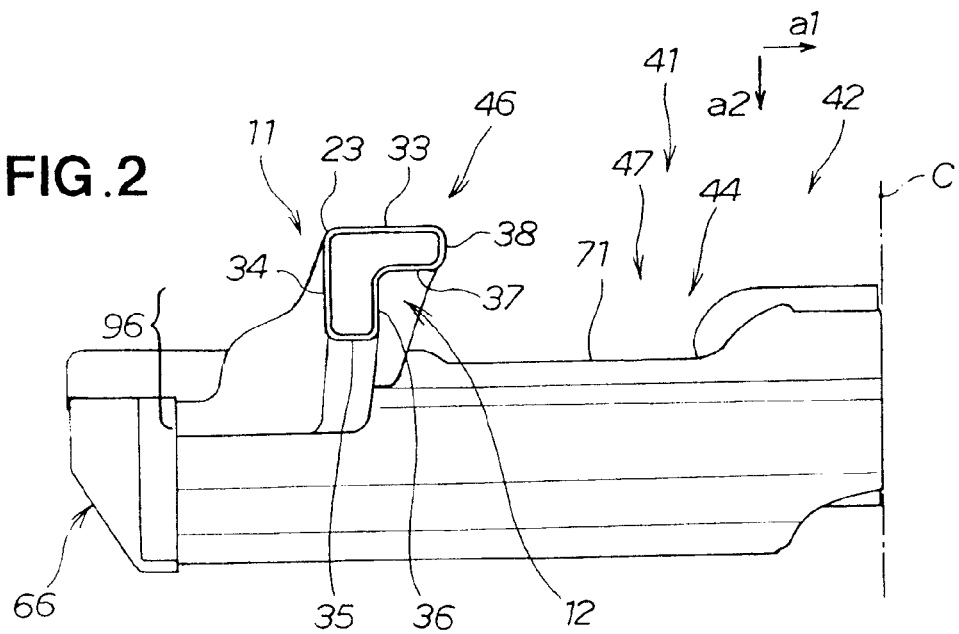

FIG.10
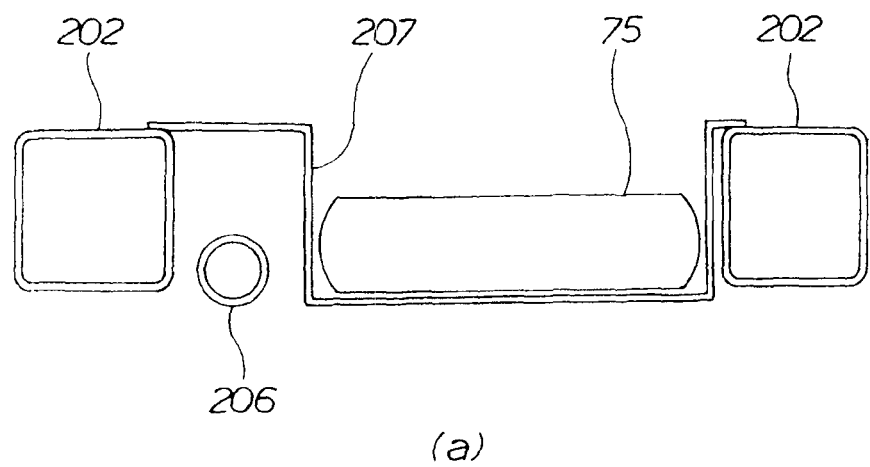
(a)
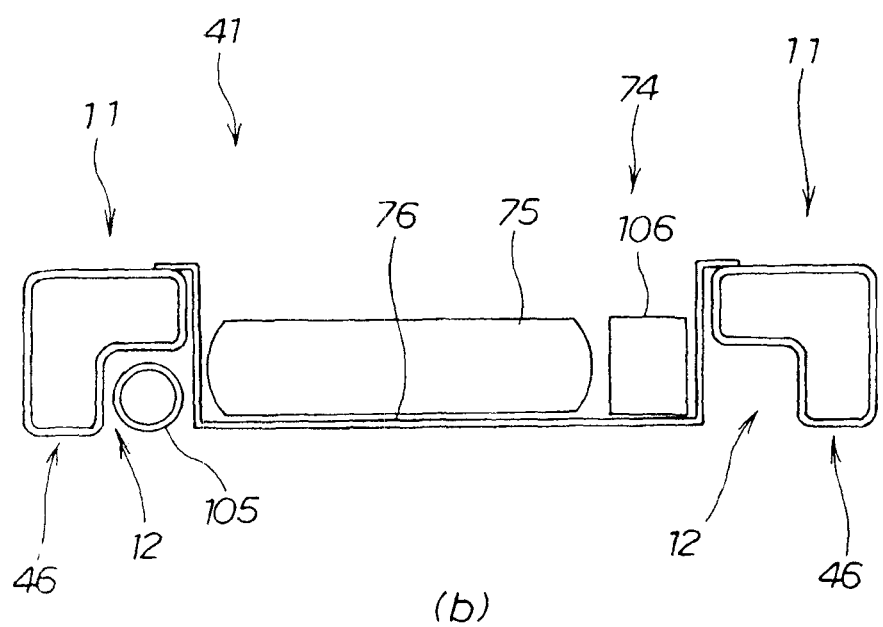
(b)

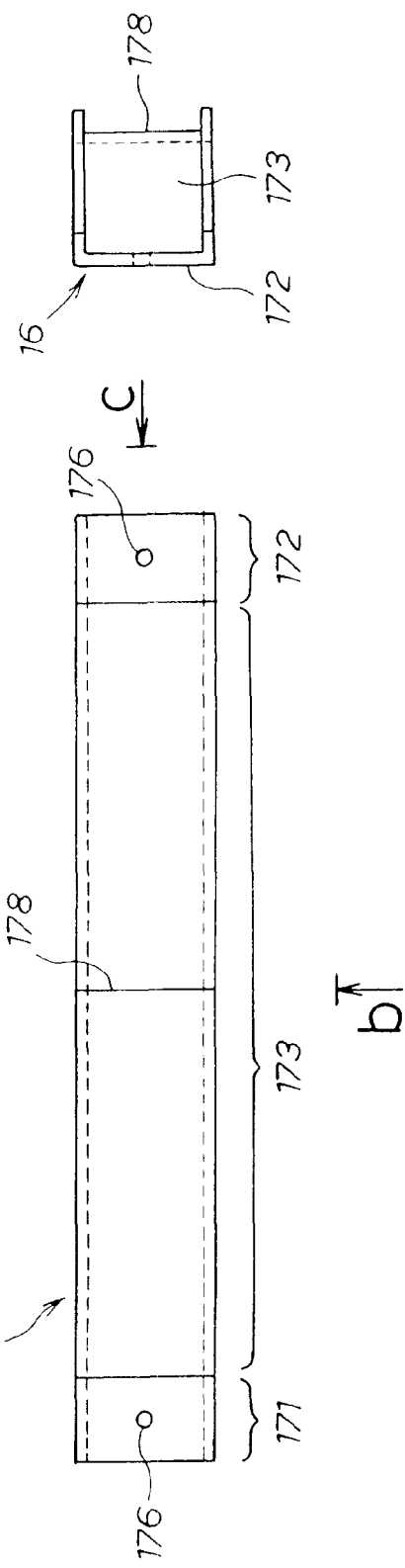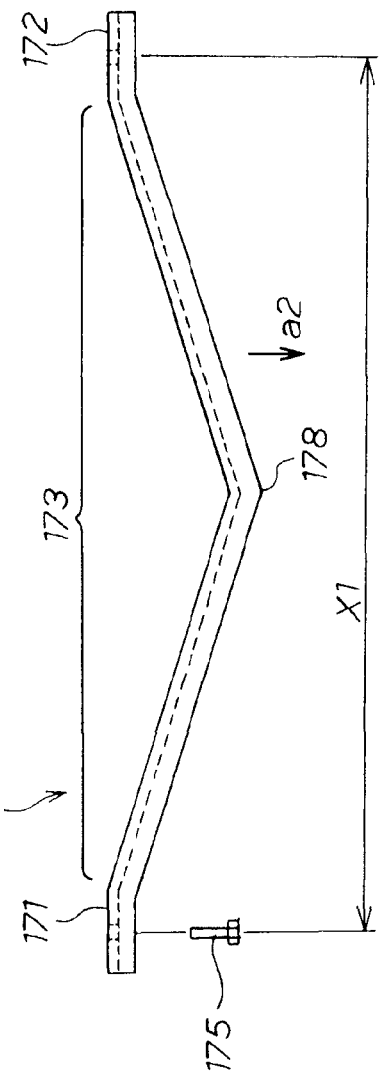

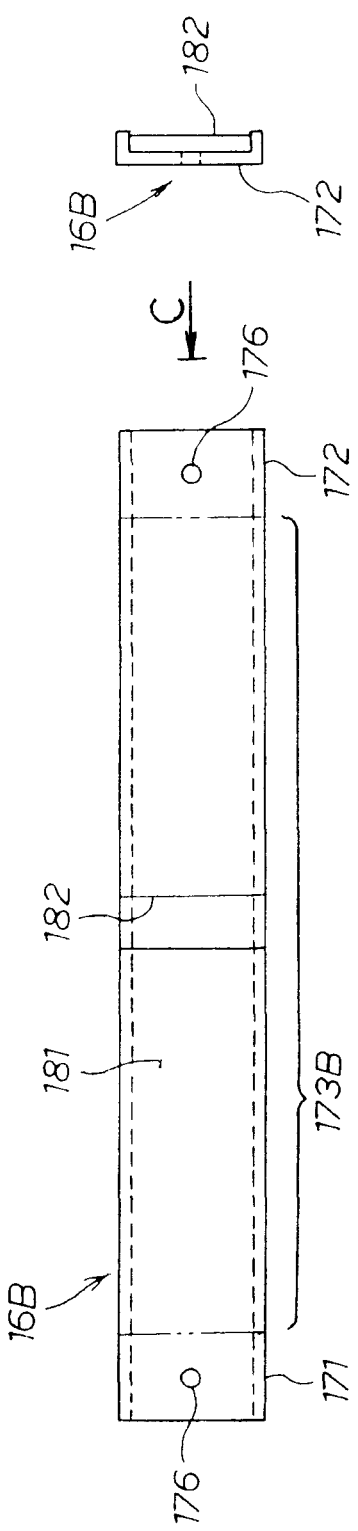
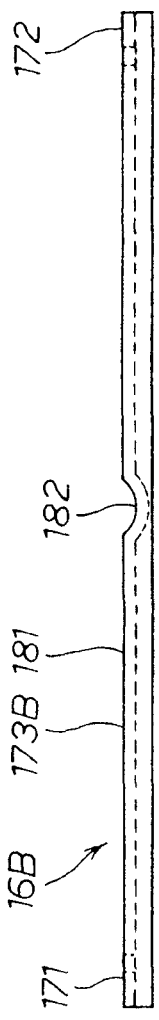
FIG.19A  FIG.19C  FIG.19B

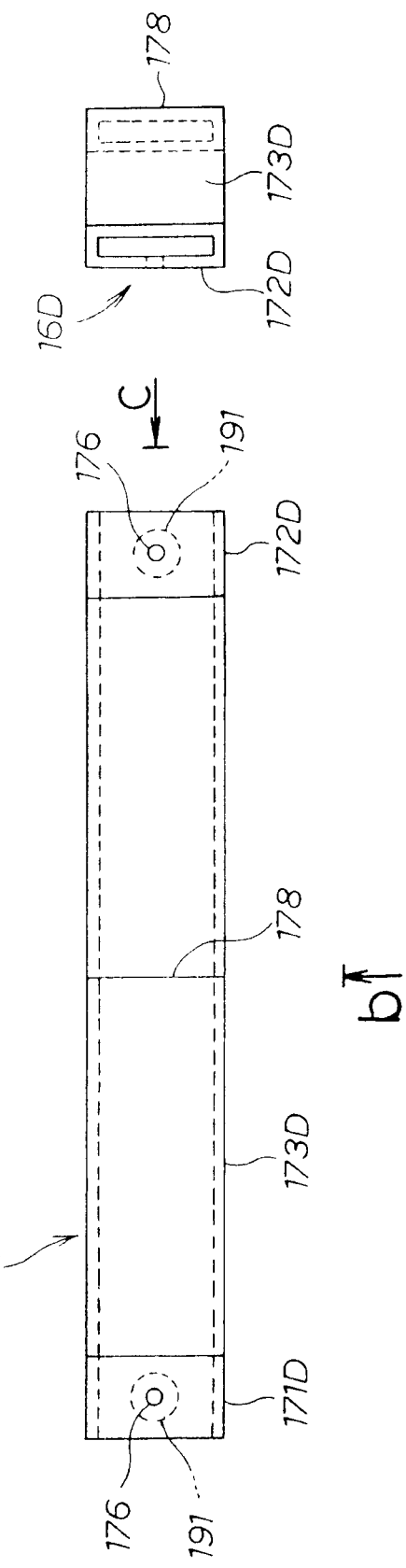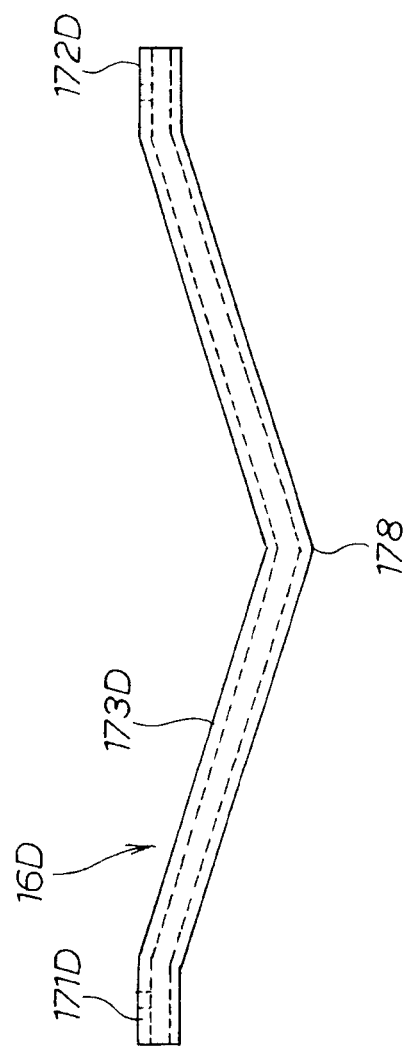

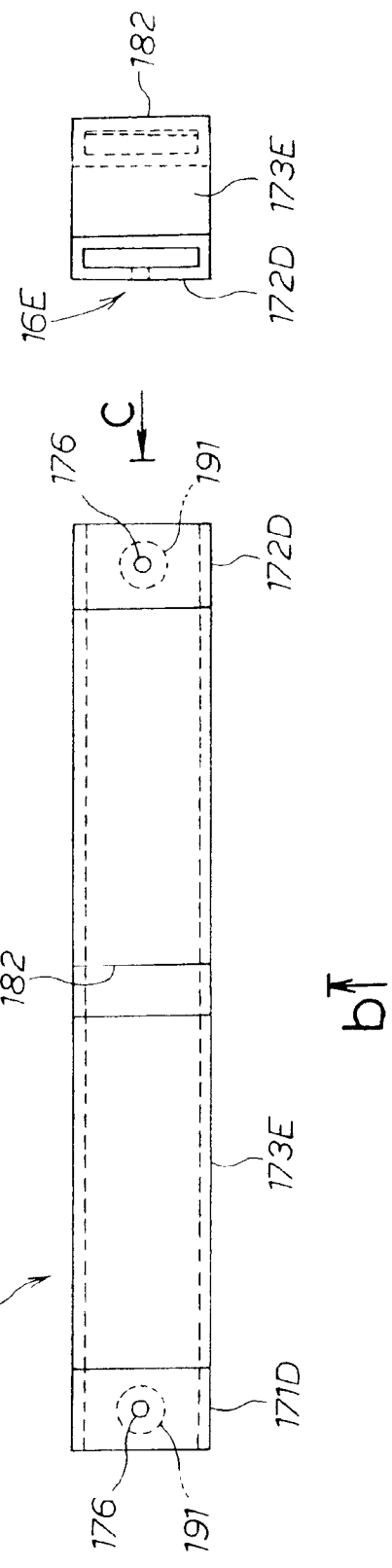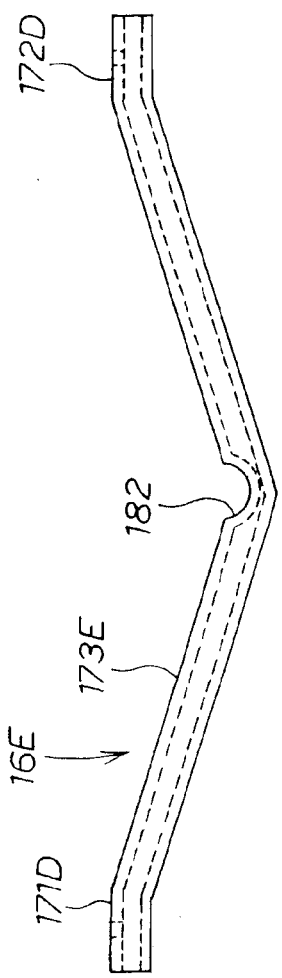
FIG.22A
FIG.22B
FIG.22C

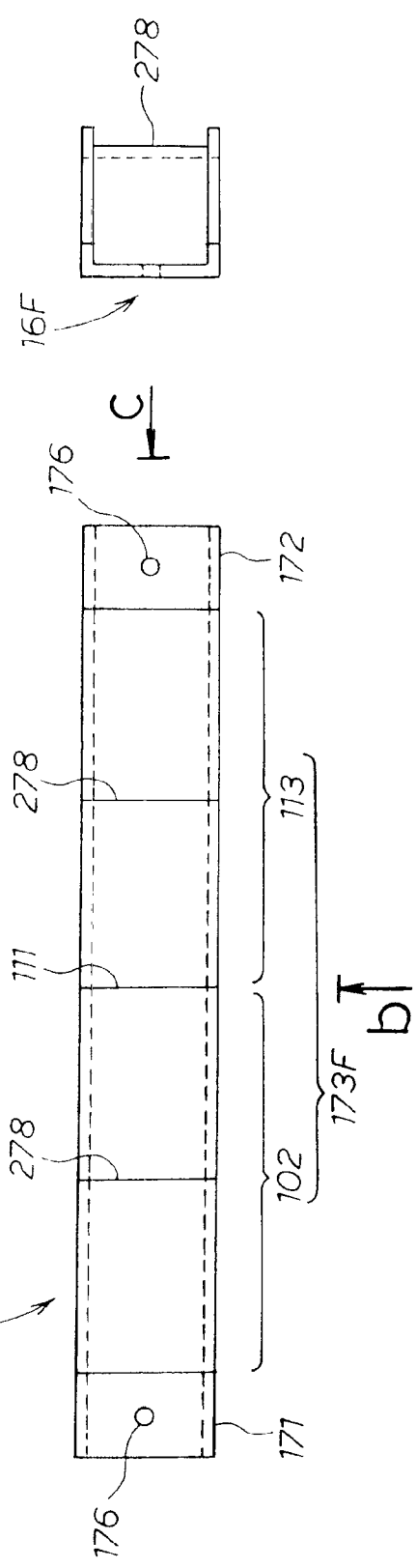
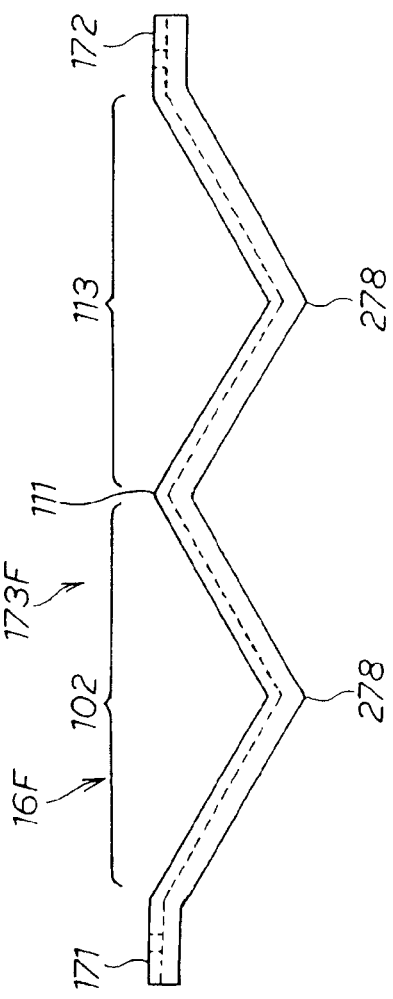

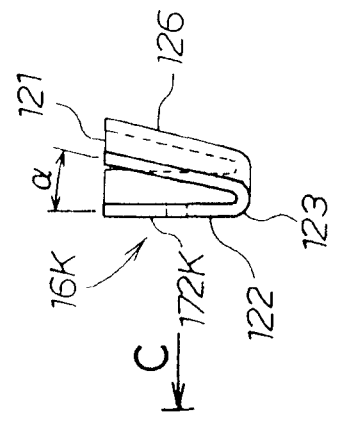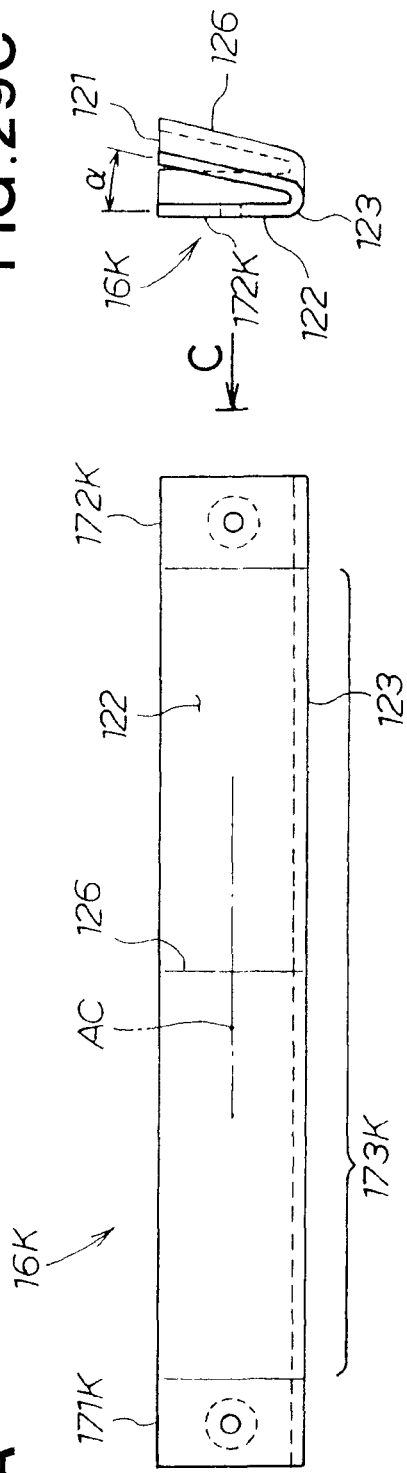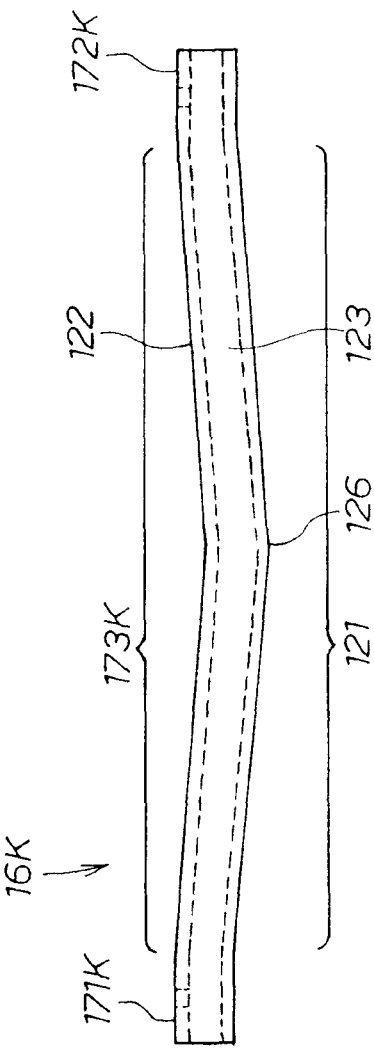

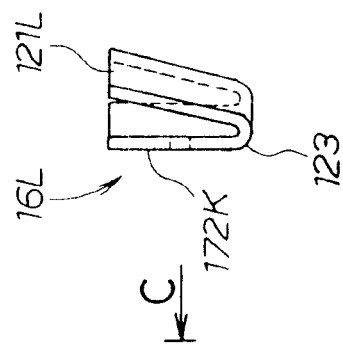
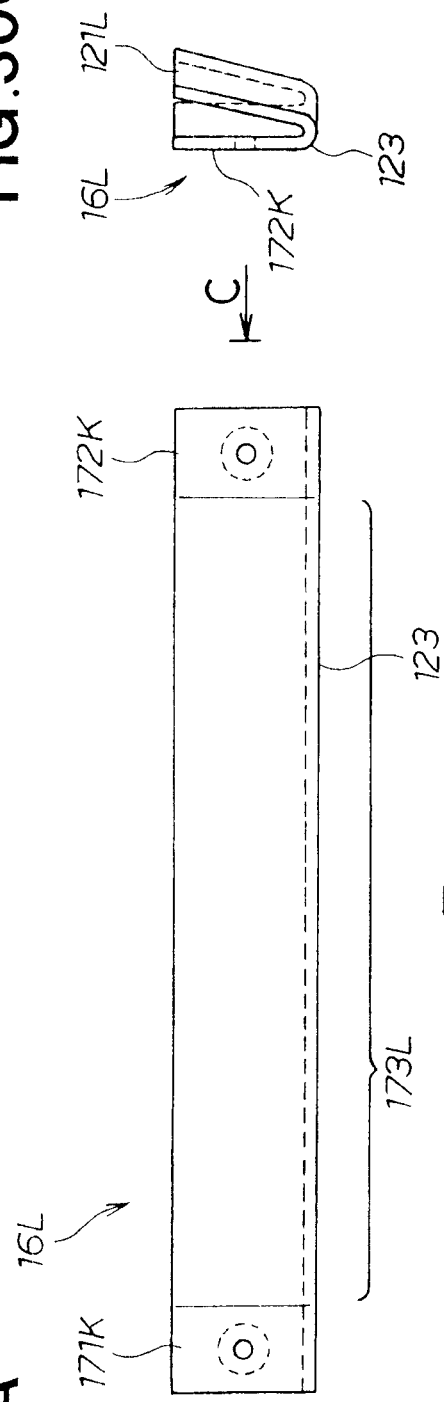
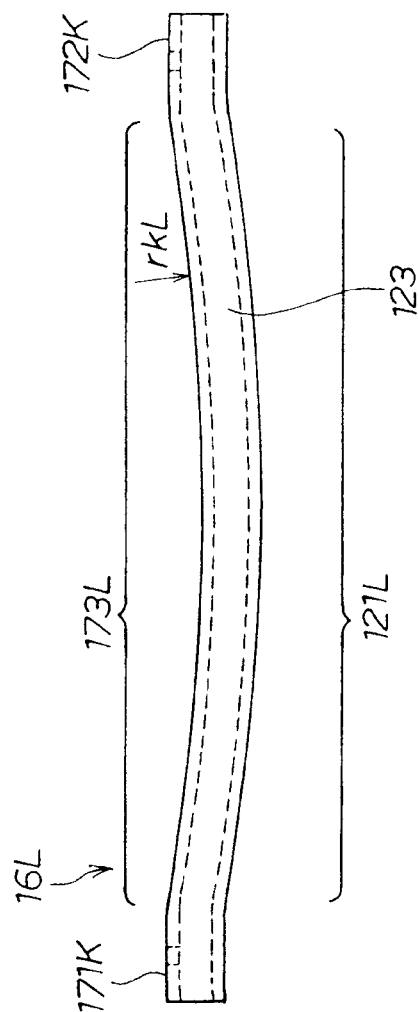

POLYGONAL CROSS-SECTIONAL FRAME, AND REAR VEHICLE BODY STRUCTURE

FIELD OF THE INVENTION

The present invention relates to polygonal cross-sectional frames for use as frames of vehicles etc. The present invention also relates to rear vehicle body structures in which a depressing member, disposed close to a rear frame extending toward the rear of a passenger compartment, depresses and displaces a vehicle-body-mounted component part at the time of a rear collision of the vehicle.

BACKGROUND OF THE INVENTION

Among the conventionally-known polygonal cross-sectional frames are ones of a hexagonal closed cross-sectional shape which are employed as frames of vehicles. One example of such polygonal closed cross-sectional frames is disclosed in Japanese Patent Application Laid-Open Publication No. H09-309455 (hereinafter referred to as "patent literature 1"), in which beads are formed on side surfaces of the frame so that the frame can effectively absorb a compressive load applied or input to the frame in the axial direction of the frame even where the frame is of a bent shape.

However, although the polygonal closed cross-sectional frame disclosed in patent literature 1 can efficiently absorb a compressive load input axially thereto, it can hardly absorb a load input thereto at an angle or obliquely to the frame axis. Therefore, there has been a demand for a polygonal cross-sectional frame which can efficiently absorb a load input to the frame obliquely to the frame axis.

Also known are rear vehicle body structures in which a depressing bracket (depressing member) is provided over a silencer disposed between left and right rear frames extending toward the rear of a passenger compartment and in which, at the time of a rear collision of the vehicle with an external obstacle or object, the depressing bracket depresses and displaces the silencer to prevent the silencer from undesirably interfering with a fuel tank disposed in front of the silencer, as disclosed in Japanese Patent No. 3920193 (hereinafter referred to as "patent literature 2").

However, the rear vehicle body structure disclosed in patent literature 2 would require a relatively great dedicated space over the silencer (vehicle-body-mounted component part) for providing the depressing member. Also, the rear vehicle body structure disclosed in patent literature 2 allows the depressing member to depress and displace the silencer by only a small amount.

SUMMARY OF THE INVENTION

In view of the foregoing prior art problems, it is a first object of the present invention to provide an improved polygonal cross-sectional frame which can efficiently absorb not only a compressive load (impact) input axially to the frame but also a compressive load (impact) input obliquely to the frame axis and can have an increased strength, with no bead formed on its side surfaces.

It is a second object of the present invention to provide an improved rear vehicle body structure which allows the depressing member to be provided in a narrow or small space between the rear frame and the vehicle-body-mounted component part, and which allows the depressing member to depress and displace the silencer by a great amount at the time of a rear collision of the vehicle.

In order to accomplish the first object, the present invention provides an improved polygonal cross-sectional frame having a hexagonal closed cross-sectional shape, the hexagonal closed cross-sectional shape of the frame being an L closed cross-sectional shape such that the frame has an inwardly recessed section in a corner portion between two leg portions of the L closed cross-sectional shape. The polygonal cross-sectional frame constructed in this manner can efficiently absorb not only a compressive load (impact) input axially to the frame but also a compressive load (impact) input obliquely to the frame axis and can have an increased strength, with no bead formed on its side surfaces.

Preferably, the inwardly recessed section is defined by: one of four corner portions of an original rectangular cross-sectional shape of the frame being removed from first and second side portions originally defining the one corner portion; a first central supporting side portion of the original rectangular cross-sectional shape extending continuously from an unremoved portion of the first side portion to or to near a centroid located centrally of the original rectangular cross-sectional shape; and a second central supporting side portion of the original rectangular cross-sectional shape extending continuously from an unremoved portion of the second side portion to the inner end of the first central supporting side portion.

Because the polygonal cross-sectional frame of the present invention has the above-mentioned inwardly recessed section, the first and second central supporting side portions can advantageously disperse a compressive load (impact) having been input to the end of the frame obliquely to the axis line of the frame. Consequently, the input compressive load (impact) transmitting toward the center (centroid) of the original rectangular cross-sectional shape of the frame can be efficiently absorbed by deformation of the first and second central supporting side portions. Also, a compressive load (impact) having been input to an end of the frame in the axial direction (parallel to the axis) of the frame can be advantageously dispersed by the first and second central supporting side portions, so that the input compressive load (impact) can be efficiently absorbed by the first and second central supporting side portions.

Preferably, the polygonal cross-sectional frame of the present invention is employed as a frame that extends to at least one of a front side frame extending forward from a floor of a passenger compartment of a vehicle and a rear frame extending rearward from the floor of the passenger compartment. In the case where the polygonal cross-sectional frame of the present invention is employed as a frame extending to the rear frame, a load input obliquely to the axis line of the rear frame due to a collision of an external obstacle against a rear end portion of the vehicle can be efficiently absorbed by deformation of the first and second central supporting side portions. Similarly, in the case where the polygonal cross-sectional frame of the present invention is employed as a frame extending to the front side frame, a load input obliquely to the axis line of the front side frame due to a collision of an external obstacle against a rear end portion of the vehicle can be efficiently absorbed by deformation of the first and second central supporting side portions.

Preferably, where the polygonal cross-sectional frame is disposed substantially horizontally, one of the first central supporting side portion and the second central supporting side portion extends vertically while the other of the first central supporting side portion and the second central supporting side portion extends horizontally. Thus, a compressive load input to the polygonal cross-sectional frame obliquely to the vertical direction or horizontal direction, i.e. in an obliquely downward, obliquely upward, obliquely rightward or obliquely leftward direction, can be dispersed by the first and second central supporting side portions.

Preferably, the second central supporting side portion intersects perpendicularly with the first central supporting side portion. Such an arrangement can further increase strength of the frame against an input compressive load.

Preferably, the inwardly recessed section of the frame is oriented to face inwardly and downwardly of the vehicle. With this arrangement, a neighboring component part, such as a tank or a suspension, can be accommodated disposed in the inwardly recessed section, and thus, the present invention can achieve an enhanced design freedom. Particularly, because a neighboring component part can be disposed in the inwardly recessed section, the neighboring component part can be located at a higher position of the vehicle, so that the floor of the vehicle can be disposed at a lower position from the ground surface, i.e. at a position lower than the conventional counterpart by the height dimension of the inwardly recessed section of the frame. Thus, this arrangement can achieve a reduced or lowered height of the floor of the vehicle. Furthermore, because a neighboring component part can be disposed in the inwardly recessed section, an increased number of neighboring component parts can be disposed between the inwardly recessed sections of a pair of the polygonal cross-sectional frames disposed in opposed relation to each other, which thereby can increase the housing capacity of the vehicle.

Preferably, the polygonal cross-sectional frame of the present invention is used in a vehicle as a rear polygonal cross-sectional frame member that extends straight to be connected to a subframe mounting portion provided at a rear end portion of a front frame member extending rearward from the floor of the passenger compartment of a vehicle. Thus, if the rear polygonal cross-sectional frame member is formed in an L closed cross-sectional shape and extended straight, a moment that would bend the rear polygonal cross-sectional frame member is less like to occur, as compared to a case where the rear frame member extends over a longer distance. Furthermore, because the subframe mounting portion provided at the rear end portion of the front frame member has an increased mechanical strength and a front portion of the rear polygonal cross-sectional frame member is supported via the mechanically-strong subframe mounting portion, the present invention can more readily produce reactive force against the bending moment.

Preferably, the polygonal cross-sectional frame of the present invention extends from the floor of the passenger compartment to be located at a height higher than the floor, and another frame extending downward from a roof rail, defining the left and right end edges of a roof of the passenger compartment, is fixedly joined at a lower end thereof to an upper portion of the polygonal cross-sectional frame. Thus, once a compressive load is input to the rear end (one end) of the polygonal cross-sectional frame, there is produced a moment that would bend the frame about the other end fixedly joined to the floor and slanting upward. Because the moment is transmitted from the upper portion of the polygonal cross-sectional frame, the polygonal cross-sectional frame can have an increased strength against the upward bending moment.

In order to accomplish the second object, the present invention provides an improved rear vehicle body structure which comprises a depressing member disposed, along the lower surface of a rear section of a rear frame extending rearward from a floor of a passenger compartment, in opposed relation to a predetermined vehicle-body-mounted component part disposed beneath the depressing member. As the rear section of the rear frame deforms due to a load input to the rear end of the rear frame, the depressing member deforms downward to depress and displace the predetermined vehicle-body-mounted component part.

Thus, the depressing member can be provided even in a small space between the lower surface of the rear section of the rear frame and the predetermined vehicle-body-mounted component part. As the rear frame compressively deforms due to a compressive load (impact) input to a rear end portion of the vehicle (rear end of the rear frame), the opposite ends of the depressing approach each other, so that an intermediate portion is pushed downward toward the vehicle-body-mounted component part. With such arrangements, the depressing member provided in the small space can appropriately depress and displace the vehicle-body-mounted component part by a great amount. By such depression by the depressing member, the vehicle-body-mounted component part can be prevented from undesirably interfering with another component part, such as a front vehicle body and/or fuel tank, disposed in front of the vehicle-body-mounted component part. As a result, the present invention permits enhancement of impact absorbing performance of the vehicle body. Furthermore, in a case where the vehicle-body-mounted component part is a silencer of an exhaust pipe, the depressing member can function also as a member for shielding heat from the silencer.

Preferably, the rear section of the rear frame has an L cross-sectional shape, and the depressing member is accommodated or disposed in an inwardly recessed section defined in a corner portion of the L cross-sectional shape of the rear section of the rear frame. Thus, the vehicle-body-mounted component part can be disposed close to the lower surface of the rear section of the rear frame.

Preferably, the depressing member is elongated along the rear frame and includes front and rear end portions fixed to the lower surface of the rear section of the rear frame and an intermediate portion formed integrally with and between the front and rear end portions. The intermediate portion is constructed to deform downward toward the predetermined vehicle-body-mounted component part in response to reduction in a distance between the front and rear end portions caused by a rear collision of the vehicle. With such arrangements, the vehicle-body-mounted component part can be depressed and displaced by the depressing member by a great amount.

Preferably, the depressing member has a frail portion provided in the upper surface of the intermediate portion to facilitate downward deformation of the depressing member. Because the depressing member has the frail portion (or easily deformable portion), it is possible to readily designate or establish a position at which the depressing member should bend or deform, in response to deformation of the rear section of the rear frame, to depress and displace the vehicle-body-mounted component part. Therefore, the rear vehicle body structure that allows the depressing member to reliably depress and displace the vehicle-body-mounted component part can be constructed in a simplified manner.

Preferably, the depressing member has a slanting surface portion facing outwardly or inwardly of the rear section of the rear frame for depressing the predetermined vehicle-body-mounted component part. In the case where the slanting surface portion is oriented to face inwardly of the rear section of the rear frame, the depressing member can displace the predetermined vehicle-body-mounted component part inwardly of the rear section of the rear frame to thereby prevent the vehicle-body-mounted component part from interfering with another component part disposed in front of the vehicle-body-mounted component part. In the case where the slanting surface portion is oriented to face outwardly of the rear section of the rear frame, on the other hand, the depressing member can displace the predetermined vehicle-body-mounted component part inwardly of the rear section of the rear frame to thereby prevent the vehicle-body-mounted component part from interfering with a fuel tank disposed in front of the vehicle-body-mounted component part.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which:

FIG. 1 is a perspective view of a first embodiment of a frame having a polygonal cross-sectional (i.e., polygonal cross-sectional frame) of the present invention and a vehicle employing such a polygonal cross-sectional frame;

FIG. 2 is a view taken in a direction of arrow 2 of FIG. 1;

FIG. 10 is a view explanatory of a mechanism employed in connection with the first embodiment of the polygonal cross-sectional frame for achieving an increased housing capacity of the vehicle;

FIGS. 17A, 17B and 17C are plan, front and side views, respectively, of a depressing member employed in the first embodiment of the rear vehicle body structure of the present invention;

FIGS. 19A, 19B and 19C are plan, front and side views, respectively, of a depressing member employed in a second embodiment of the rear vehicle body structure of the present invention;

FIGS. 21A, 21B and 21C are plan, front and side views, respectively, of a depressing member employed in a fourth embodiment of the rear vehicle body structure of the present invention;

FIGS. 22A, 22B and 22C are plan, front and side views, respectively, of a depressing member employed in a fifth embodiment of the rear vehicle body structure of the present invention;

FIGS. 23A, 23B and 23C are plan, front and side views, respectively, of a depressing member employed in a sixth embodiment of the rear vehicle body structure of the present invention;

FIGS. 29A, 29B and 29C are plan, front and side views, respectively, of a depressing member employed in the tenth embodiment of the rear vehicle body structure of the present invention; and FIGS. 30A, 30B and 30C are plan, front and side views, respectively, of a depressing member employed in an eleventh embodiment of the rear vehicle body structure of the present invention.

DETAILED DESCRIPTION OF THE PREFERRED EMBODIMENTS

FIG. 1 is a perspective view of a first embodiment of a frame having a polygonal cross-sectional (i.e., polygonal cross-sectional frame) of the present invention and a vehicle employing the polygonal cross-sectional frame, and FIG. 2 is a view taken in a direction of arrow 2 of FIG. 1.

As shown in FIGS. 1 and 2, the first embodiment of the polygonal cross-sectional frame 11 is a hollow frame of a hexagonal closed cross-sectional shape that is, in this case, an L closed cross-sectional shape such that the frame 11 has, as viewed in cross-section, an inwardly recessed section in a corner portion between two leg portions of the L closed cross-sectional shape. The polygonal cross-sectional frame 11 has a desired longitudinal length S.

Figure 3:
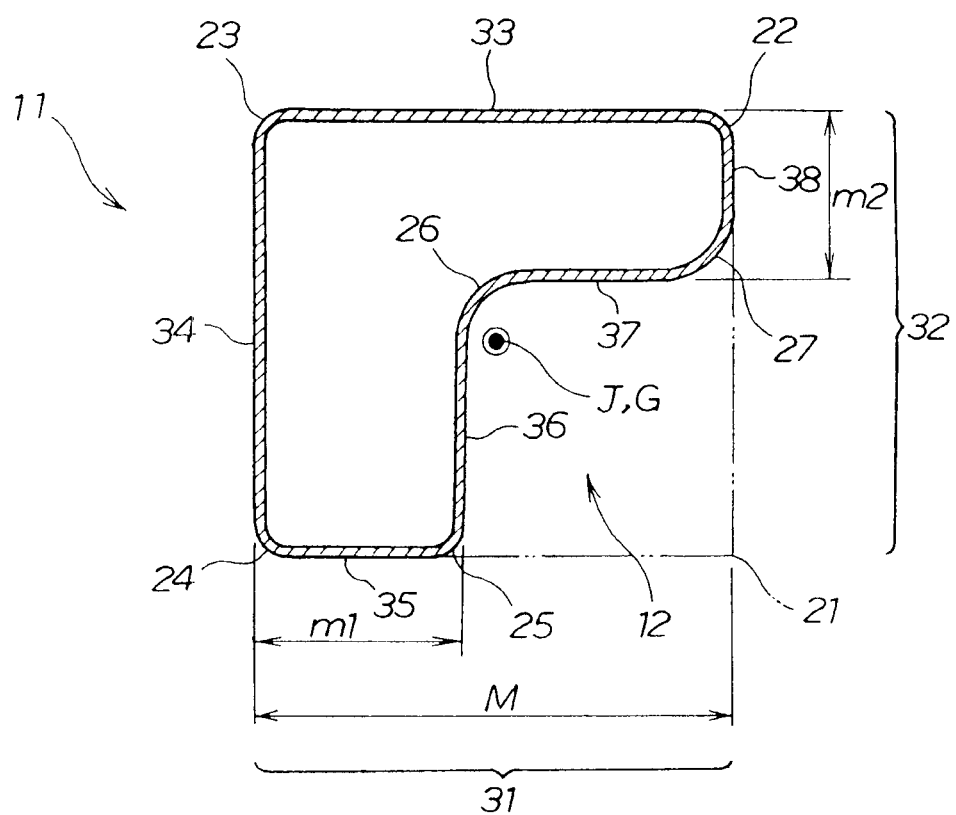
FIG. 3 is a sectional view taken along line 3-3 of FIG. 1.

As depicted in a cross-sectional view of FIG. 3 taken perpendicularly to the longitudinal axis line J (FIGS. 1, 5 and 6) of the polygonal cross-sectional frame 11, the frame 11 has the inwardly recessed section 12 formed, for example, by curving or denting a part of an original rectangular cross-sectional shape of the frame 11 inwardly to or beyond a centroid (or center) G of the original rectangular cross-sectional shape of the frame. It can be said that the inwardly recessed section 12 is formed in a corner portion between two leg portions of the L cross-sectional shape.

As shown in FIG. 3, the original rectangular cross-sectional shape of the frame 11 is defined by first to fourth corner portions 21 to 24 and first to fourth side portions 31 to 34. Further, the L closed cross-sectional shape, defining the inwardly recessed section 12, of the frame 11 is defined by second to seventh corner portions 22 to 27, and third and fourth side portions 33 and 34, first remaining or unremoved side portion 35, first and second central supporting side portions 36 and 37 and second remaining or unremoved side portion 38.

Now, with reference to FIGS. 1 to 8, a description will be given about principal elements of the polygonal cross-sectional frame 11.

In the polygonal cross-sectional frame 11, the above-mentioned inwardly recessed section 12 is defined by: the first corner portion 21 of the four corner portions (i.e., first to fourth corner portions 21 to 24) of the original rectangular cross-sectional shape being taken away or removed from the first and second side portions 31 and 32 originally defining the first corner portion 21; the first central supporting side portion 36 of the original rectangular cross-sectional shape extending integrally or continuously from a remaining or unremoved portion of the first side portion 31 (i.e., first unremoved side portion 35) to or to near the centroid (center) G located centrally of the original rectangular cross-shape of the frame 11; and the second central supporting side portion 37 of the original rectangular cross-sectional shape extending integrally or continuously from a remaining or unremoved portion of the second side portion 32 (i.e., second unremoved side portion 38) to connect to the inner end of the first central supporting side portion 36.

Figure 4:
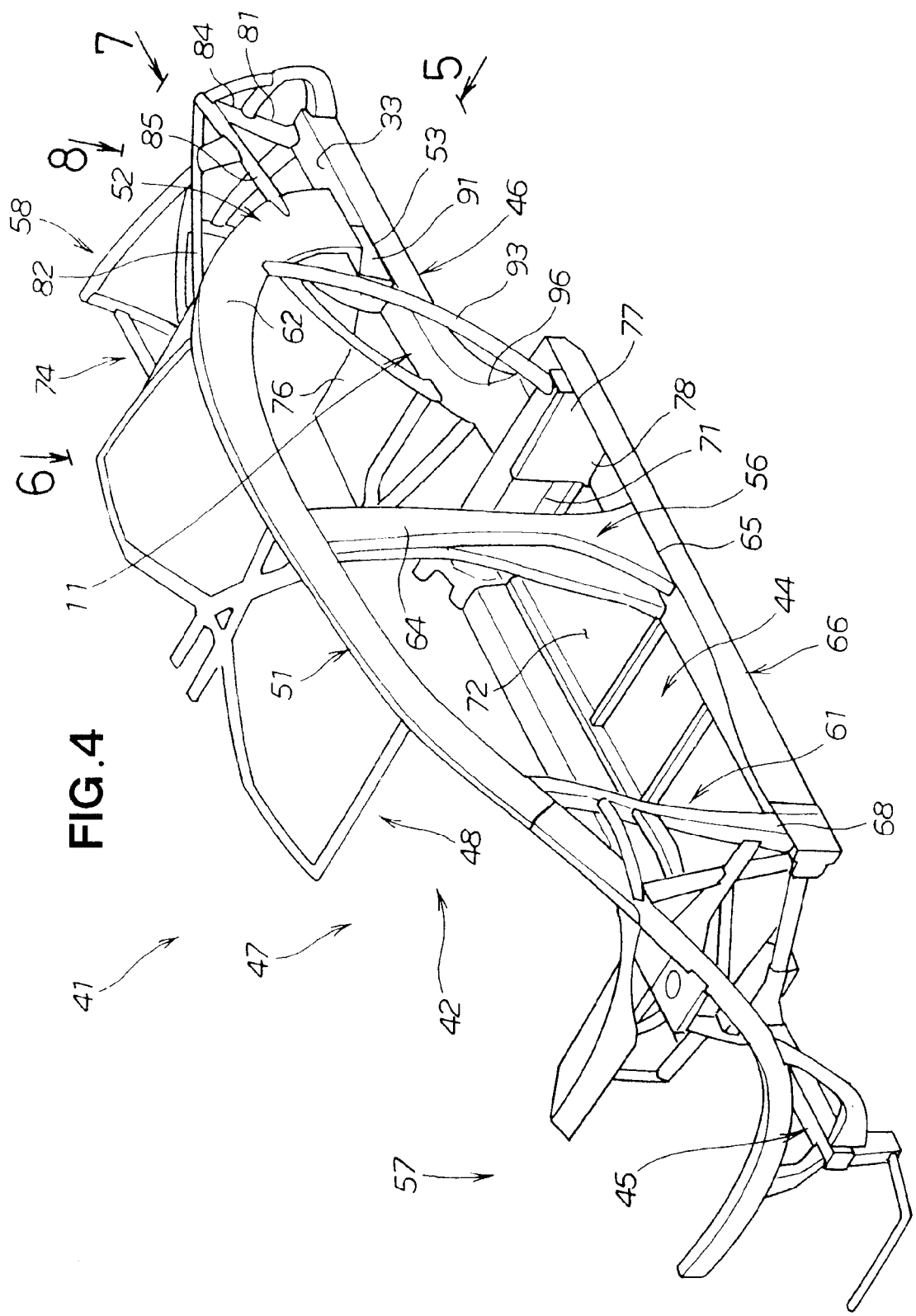
FIG. 4 is a perspective view of the vehicle employing the first embodiment of the polygonal cross-sectional frame.

As shown in FIG. 4, the polygonal cross-sectional frame 11 is a frame that connects to at least one of a front side frame 45 extending forward from a floor (under body) 44 of a passenger compartment 42 of a vehicle 41 and a rear frame 46 extending rearward from the floor (under body) 44 of the passenger compartment 42, and that thereby constitutes at least part of the front side frame 45 and rear frame 46. Note that a vehicle body 47 of the vehicle 41 is horizontally symmetric about a longitudinal centerline C of FIGS. 2 and 6.

Figure 5:
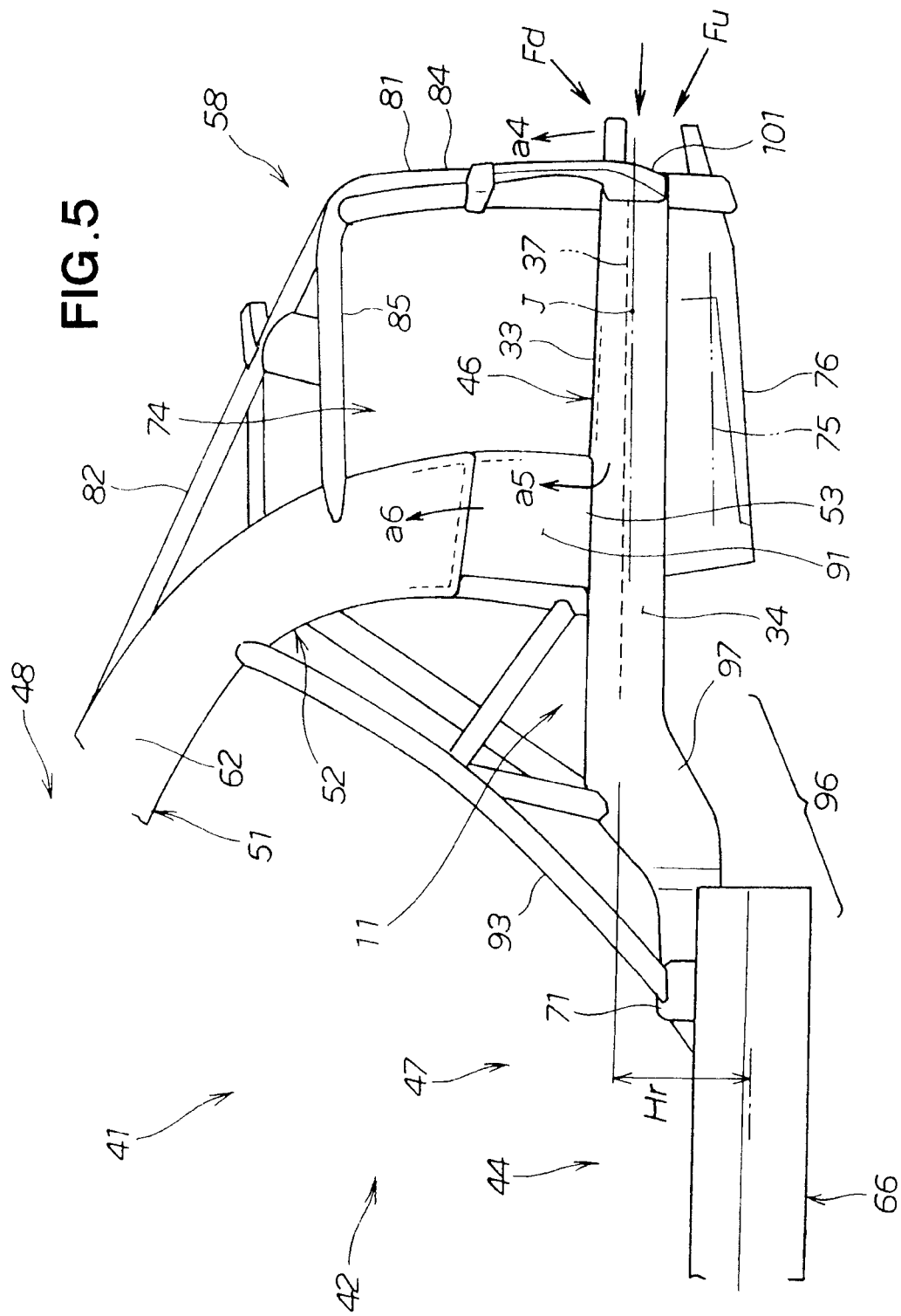
FIG. 5 is a view taken in a direction of arrow 5 of FIG. 4.

In a case where the polygonal cross-sectional frame 11 is disposed horizontally as shown in FIGS. 2, 3 and 5, one of the first and second central supporting side portions 36 and 37 (first central supporting side portion 36 in the illustrated example) extends vertically while the other of the first and second central supporting side portions 36 and 37 (second central supporting side portion 37 in the illustrated example) extends horizontally. Thus, the second central supporting side portion 37 intersects perpendicularly with the first central supporting side portion 36.

Figure 7:
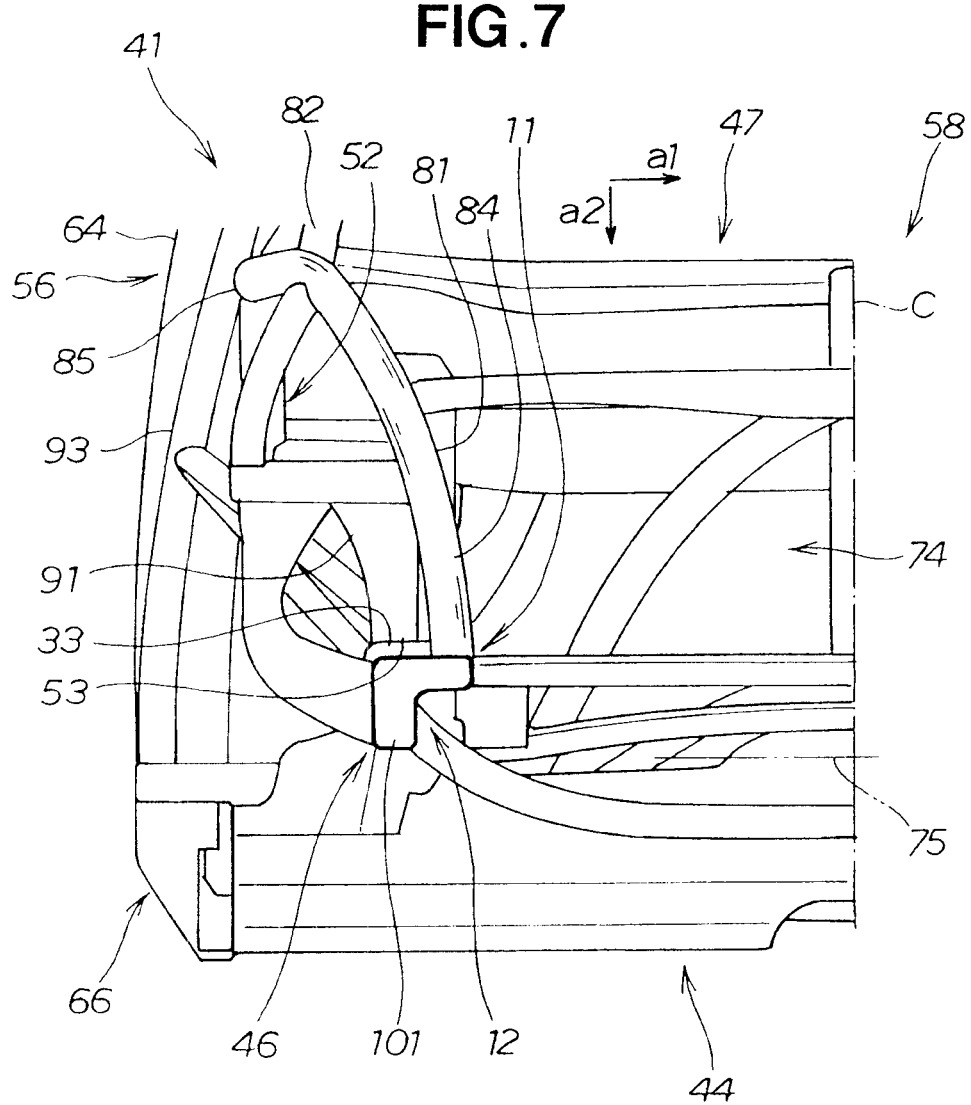
FIG. 7 is a view taken in a direction of arrow 7 of FIG. 4.

As shown in FIGS. 2 and 7, the inwardly recessed section 12 faces inwardly of the vehicle 41 (i.e., in a direction of arrow a1) and downwardly of the vehicle 41 (i.e., in a direction of arrow a2).

Figure 6:
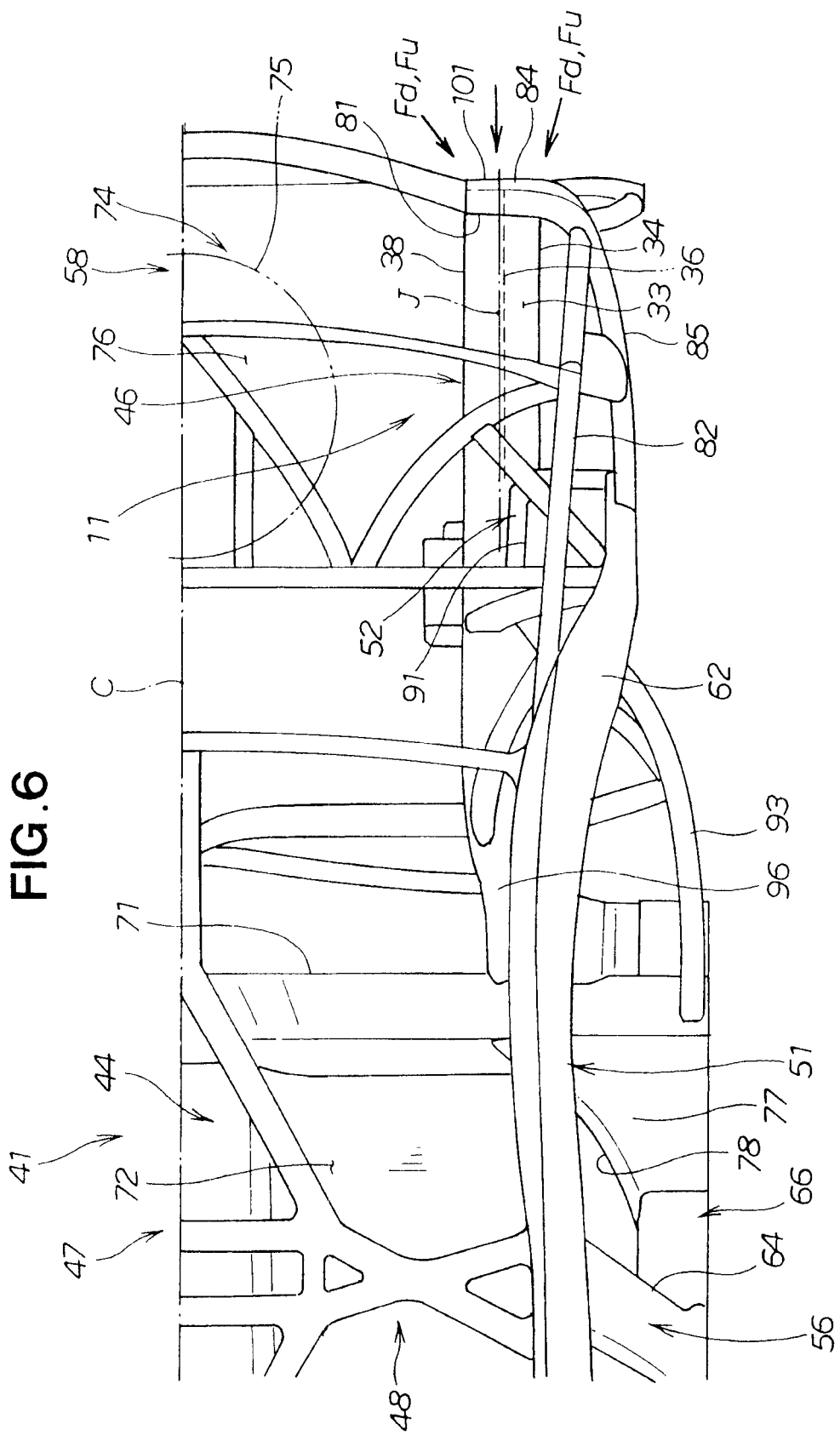
FIG. 6 is a view taken in a direction of arrow 6 of FIG. 4.

As shown in FIGS. 4 to 6, the polygonal cross-sectional frame 11 extends continuously from the floor (under body) 44 of the passenger compartment 42 to be generally located at a height Hr above the floor (under body 44), and a rear pillar 52 fixed at its upper end to a roof rail 51, defining the left and right end edges of a roof 48 of the passenger compartment 42 and extending downward from the roof rail 51, is fixedly joined at the lower end 53 to an upper portion (i.e., third side portion 33) of the polygonal cross-sectional frame 11 employed in the vehicle 41.

The following describe in detail the vehicle 41 and then the polygonal cross-sectional frame 11.

The vehicle 41 includes the passenger compartment 42 and the vehicle body 47. The vehicle body 47 includes the floor (i.e., under body) 44 of the passenger compartment 42, side walls (i.e., side bodies 56), front vehicle body section (i.e., frond body 57) connecting to the front of the passenger compartment 42, rear vehicle body section (i.e., rear body 58) connecting to the back of the passenger compartment 42, and the roof 48 of the passenger compartment 42.

Each of the side bodies 56 includes a front pillar 61 extending downward from the front end of the roof rail 51, and the rear pillar 52 extending downward from the rear end of the roof rail 51. Note that the rear pillar 52 is also a part of the rear body 58.

The side body 56 also includes a center pillar 64 extending from a longitudinally-middle portion of the roof rail 51, and a side sill 66 to which is fixedly joined the lower end 65 of the center pillar 64. Note that the side sill 66 is also a part of the under body 44. The front pillar 61 is fixedly joined at its lower end 68 to the side sill 66.

The under body 44 includes a middle floor cross member 71 provided in a rear portion thereof, and the middle floor cross member 71 extends in a vehicle width direction and is fixedly joined at its opposite ends to a rear portion of the under body 44a and a rear portion of the side sill 66.

The under body 44 also includes a floor panel 72 fixedly joined to the middle floor cross member 71 and side sill 66. The floor panel 72 extends to a luggage compartment 74 of the rear body 58, and the floor panel 72 of the luggage compartment 74 has a concave section 76 formed therein for accommodating a spare tire 75 (FIG. 6).

A corner member 78 is mounted to an intersecting portion 77 defined by the middle floor cross member 71 and the side sill 66. The rear frame 46 of the rear body 58 extends rearwardly from the middle floor cross member 71.

The rear body 58 includes the rear frame 46, a rear end frame 81 extending upward from a rear end portion of the rear frame 46, and a rear side upper frame 82 connected to the upper end of the rear end frame 81 and disposed over the rear frame 46.

The rear side upper frame 82 is fixedly connected at its one end to an upper portion of the real pillar 52 (i.e., rear end 62 of the roof rail 51) and extends rearwardly and downwardly of the vehicle 41 to be fixedly connected at its other end to the upper end of the rear end frame 81.

As shown in FIG. 5, the rear end frame 81, which is of a generally L shape, includes a vertical end section 84 and a horizontal mid section 85 substantially parallel to the rear frame 46. More specifically, as viewed from a side of the vehicle 41 (i.e., as shown in FIG. 5), the end section 84 is fixedly joined vertically to a rear end portion of the rear frame 46. As viewed from the back of the vehicle 41 (i.e., as shown in FIG. 7), the end section 84 curves upwardly and outwardly from the rear end portion of the rear frame 46.

The mid section 85 extends horizontally from the upper end of the end section 84 to be fixedly joined to a middle portion of the rear pillar 52. The rear pillar 52 has a wheel-accommodating concave portion 91 concaved from immediately below the middle region of the rear pillar 52, to which the mid section 85 of the rear end frame 81 is fixedly joined, inwardly of the vehicle 41 (i.e., toward the luggage compartment 74), and the concave portion 91 is fixedly joined at its lower edge to the upper portion (i.e., third side portion 33) of the polygonal cross-sectional frame 11.

A front frame 93 (FIG. 4) of the rear pillar 52 is fixedly joined at its lower end to the middle floor cross member 71, and this rear pillar front frame 93 is curved outwardly of the polygonal cross-sectional frame 11.

In the first embodiment of the polygonal cross-sectional frame 11, as shown in FIG. 3, adjoining ones of the side portions 33 to 38 (i.e., third and fourth side portions 33 and 34, first unremoved side portion 35, first and second central supporting side portions 36 and 37 and second unremoved side portion 38) are integrally joined at right angles to each other.

The first to fourth side portions 31 to 34 of the polygonal cross-sectional frame 11 each have a length M. The first unremoved side portion 35 has a length m1 that is about 50% of the length M, and the second unremoved side portion 38 has length m2 that is about 50% of the length M. Note that the lengths m1 and m2 are changed depending on various conditions, such as intensities of expected loads.

More specifically, as shown in FIG. 1, the rear frame 46 includes a slanting fixed section 96 fixedly joined at one end to the middle floor cross member 71 and side sill 66, and a polygonal cross-sectional frame body that is the first embodiment of the polygonal cross-sectional frame 11 and that extends horizontally straight from the other end of the slanting fixed section 96 as best seen in FIG. 5. The slanting fixed section 96 includes a front portion fixedly joined to the middle floor cross member 71 and side sill 66, and an upward slanting portion 97 extending upwardly and rearwardly from the rear end of the front portion.

Next, a more detailed description will be given about the polygonal cross-sectional frame 11 (rear frame 46).

As shown in FIGS. 1 and 5 to 8, once a compressive load Fd or a compressive load Fu is input to the rear end 101 of the polygonal cross-sectional frame 11 (rear frame 46) obliquely to the axis line J, the first and second central supporting side portions 36 and 37 produce reactive force against a moment of the input compressive load Fd or Fu.

Further, when the polygonal cross-sectional frame 11 (rear frame 46) has started to plastically deform due to the compressive load Fd or Fu input obliquely to the axis line J, the first and second central supporting side portions 36 and 37 can efficiently absorb the compressive load Fd or Fu.

Next, a description will be given about a mechanism employed in connection with the first embodiment of the polygonal cross-sectional frame 11 for reducing a height of the vehicle floor with reference to FIG. 9, of which (a) is explanatory of a comparative example of a conventional rear frame 201 of a rectangular cross-sectional shape while (b) is explanatory of the first embodiment of the polygonal cross-sectional frame 11 (rear frame 46).

The first embodiment of the rear frame 46 allows the floor (under body) 44 of the luggage compartment 74 to be reduced or lowered in height from the ground level by an amount Ah, as compared to the conventional rear frame 201.

Figure 9:
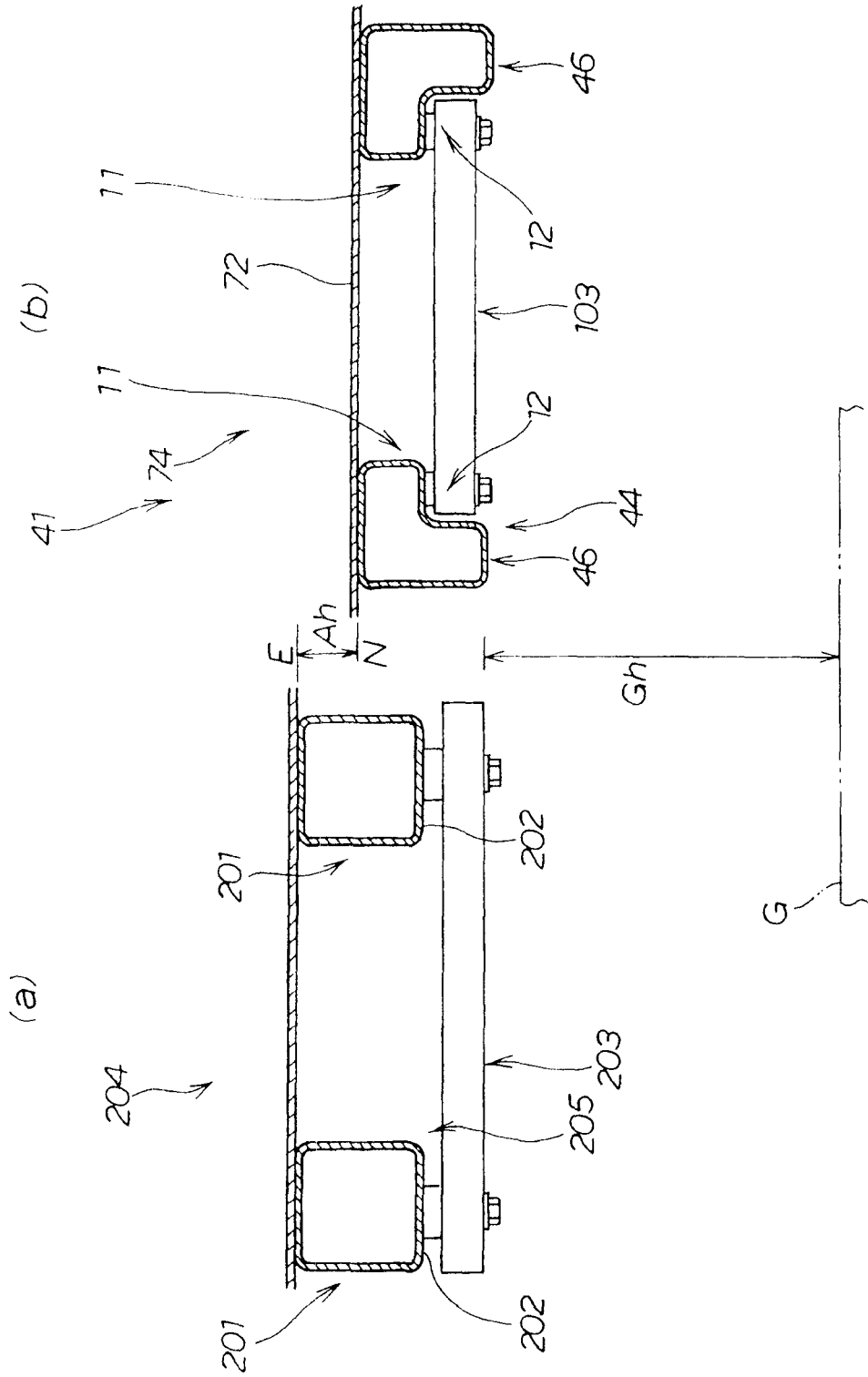
FIG. 9 is a view explanatory of a mechanism employed in connection with the first embodiment of the polygonal cross-sectional frame for achieving a reduced height of a floor of the vehicle.

According to the comparative example, a subframe 203 is mounted at its side edge portions to the undersides 202 of the left and right rear frames 201, a floor (under body 205) of a luggage compartment 204 is located at a height position E, as shown in (a) of FIG. 9.

In the case where the first embodiment of the present invention is employed, on the other hand, a subframe 103 is mounted with its opposite side edge portions accommodated or disposed in the recessed sections 12 of the left and right rear frames 46 (polygonal cross-sectional frames 11) opposed to each other, so that the subframe 103 is located closer to the floor (floor panel 72) of the luggage compartment 74, as shown in (b) of FIG. 9. In this state, the subframe 103 is located at a height Gh from the ground surface G, and thus, the floor (floor panel 72) of the luggage compartment 74 is located at a height position N much lower than the height position E of the floor (under body 205) of a luggage compartment 204. In this manner, the first embodiment of the present invention permits a reduced or lowered height of the floor (floor panel 72) of the luggage compartment 74.

Next, a description will be given about a mechanism employed in connection with the first embodiment of the polygonal cross-sectional frame 11 for increasing a housing capacity with reference to FIG. 10, of which (a) is explanatory of a comparative example of a conventional rear frame 202 of a rectangular cross-sectional shape while (b) is explanatory of the first embodiment.

By the provision of the inwardly recessed section 12, the first embodiment of the polygonal cross-sectional frame 11 (rear frame 46) permits an increased housing capacity, i.e. capacity for housing vehicle-mounted component parts, as compared to the conventional rear frame 202 having no recessed section like the recessed section 12.

As shown in (a) of FIG. 10, a spare tire 75 and exhaust pipe 206 (or canister) are disposed between the conventional rectangular cross-sectional rear frames 201, particularly with the exhaust pipe 206 (or canister) located outside a floor panel 207, i.e. in a space between a straight, inner vertical side wall of the rectangular cross-sectional rear frame 201 and the floor panel 207.

In the case where the first embodiment is employed, on the other hand, an exhaust pipe 105 (or canister) is disposed in the inwardly recessed section 12. In this case, the concave section 76 can be increased in width because the exhaust pipe 105 (or canister) is in the inwardly recessed section 12, so that the spare tire 75, toolbox 106, etc. can be placed in the concave section 76 between the left and right rear frames 46. Thus, the first embodiment permits housing of an increased number of component parts and hence an increased housing capacity of the vehicle.

Figure 8:
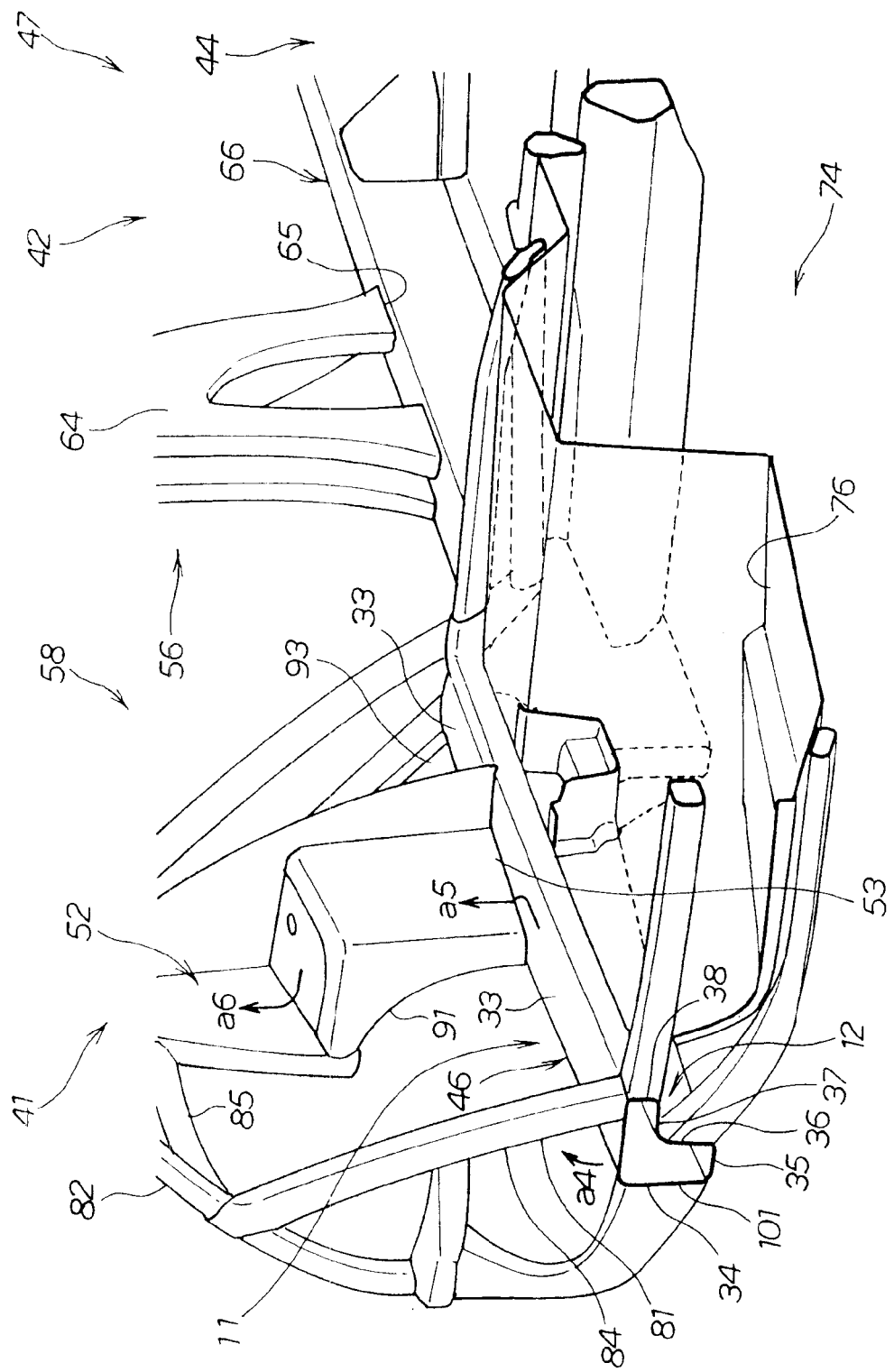
FIG. 8 is a view taken in a direction of arrow 8 of FIG. 4.

In the case where the first embodiment is employed, once a load is input to the rear end 101 of the rear frame 46, there is produced a moment that would bend the rear frame 46 upward as indicated by arrow a4 about one or front end portion (slanting fixed section 96) of the rear frame 46, as shown in FIGS. 1, 5 and 8. The moment is transmitted from the upper portion (i.e., third side portion 33) of the polygonal cross-sectional frame 11 to the rear pillar 52 as indicated by arrows a5 and a6. In this way, the polygonal cross-sectional frame 11 can have an increased strength against the upward bending moment (acting in the direction of arrow a4).

Figure 11:
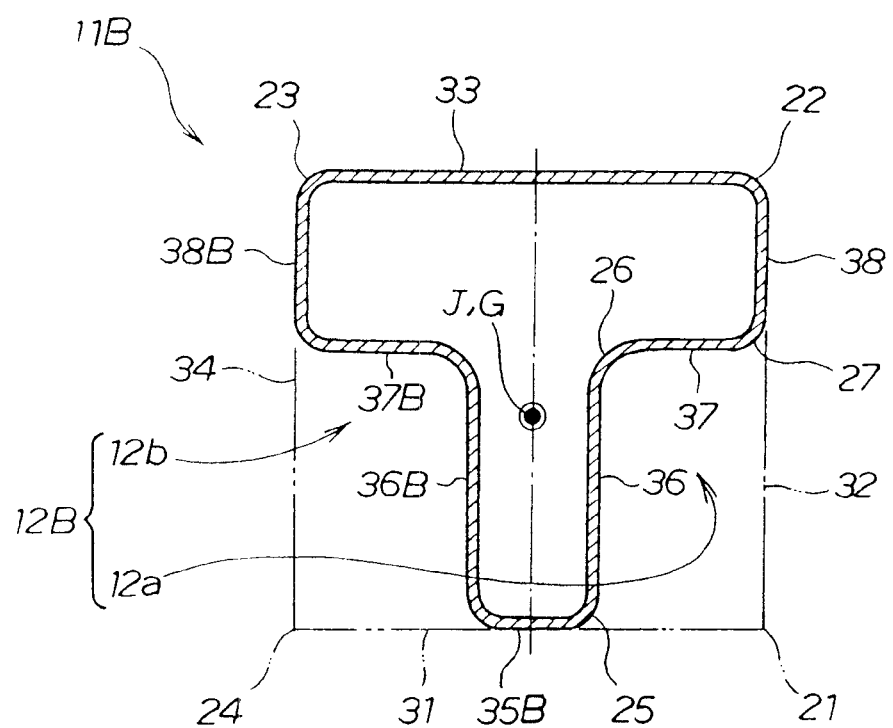
FIG. 11 is a sectional view showing a second embodiment of the polygonal cross-sectional frame of the present invention.

Next, a description will be given about a second embodiment of the polygonal cross-sectional frame 11B of the present invention, with reference to FIG. 11 that is a view similar to FIG. 3. Similar elements to those in the first embodiment of FIGS. 1 to 8 are indicated by the same reference numerals as used for the first embodiment and will not be described here to avoid unnecessary duplication.

The second embodiment of the polygonal cross-sectional frame 11B is characterized by inclusion of an inwardly recessed section 12B that comprises a first inwardly recessed section 12a and a second inwardly recessed section 12b that are formed by curving or denting two corner portions of the original rectangular cross-sectional shape inwardly to near the centroid G. The second embodiment of the polygonal cross-sectional frame 11B, as a whole, has a T closed cross-sectional shape. It may be said that the second embodiment of the polygonal cross-sectional frame 11B comprises a pair of frames, each having an L closed cross-sectional shape similar to the first embodiment 11, integrally formed together.

The first inwardly recessed section 12a is formed by removing the first corner portion 21 from the original rectangular cross-sectional shape of the frame 11B, while the second inwardly recessed section 12b is formed by removing the fourth corner portion 24 from the original rectangular cross-sectional shape of the frame 11B. The third central supporting side portion 36B extends integrally from the unremoved portion of the first side portion 31 (i.e., first unremoved side portion 35B) to or to near the centroid G located centrally of the rectangular cross-sectional shape of the frame 11B, and the fourth central supporting side portion 37B extends integrally from the unremoved portion of the fourth side portion 34 (i.e., third unremoved side portion 38B) to the first central supporting side portion 35B. The unremoved portion of the first side portion 31 (i.e., first unremoved side portion 35B) is formed centrally of the first side portion 31. The first recessed section 12a is defined in a similar manner to the second recessed section 12b.

The first and second inwardly recessed sections 12a and 12b are changed in size depending on various conditions, such as intensities of expected input loads. Whereas the first and second inwardly recessed sections 12a and 12b are formed horizontally symmetric to each other about a vertical line passing the centroid G, they may be formed horizontally asymmetric to each other.

The second embodiment of the polygonal cross-sectional frame 11B constructed in the aforementioned manner can achieve the same behavior and advantageous benefits as the above-described first embodiment of the polygonal cross-sectional frame 11A.

Figure 12:
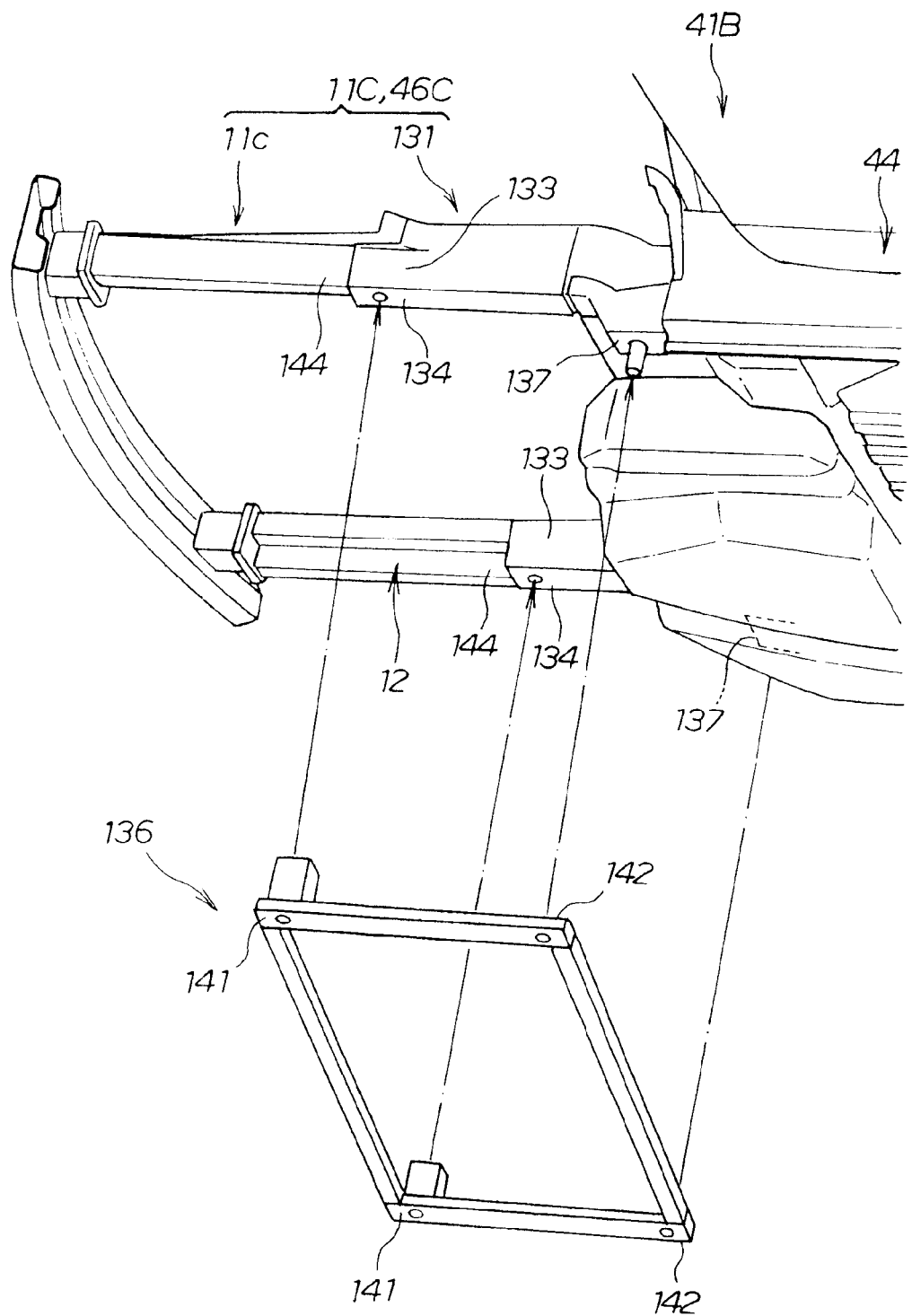
FIG. 12 is a perspective view of a third embodiment of the polygonal cross-sectional frame of the present invention and a vehicle employing the third embodiment of the polygonal cross-sectional frame.

Next, a description will be given about a third embodiment of the polygonal cross-sectional frame 11C, with reference to FIG. 12. Similar elements to those in the first embodiment of FIGS. 1 to 8 are indicated by the same reference numerals as used for the first embodiment and will not be described here to avoid unnecessary duplication.

The third embodiment of the polygonal cross-sectional frame 11C is used as a rear frame 46C, which comprises a first or rear polygonal cross-sectional frame member 11c and a second or front polygonal cross-sectional frame member 131. The first or rear polygonal cross-sectional frame member 11c is similar to the above-described first embodiment of the polygonal cross-sectional frame 11, but different from the first embodiment 11 in that it has a shorter total length than the first embodiment of the polygonal cross-sectional frame 11.

The rear polygonal cross-sectional frame member 11c constitutes a rear frame of a vehicle 41B and extends straight to connect to a subframe mounting portion 134 provided at a rear end portion 133 of the front polygonal cross-sectional frame member 131 extending from the floor (under body) 44 of the passenger compartment 42 of the vehicle 41.

The polygonal cross-sectional frame member 11c includes the inwardly recessed section 12 similar to the one in the above-described first embodiment, and the front polygonal cross-sectional frame member 131 has a square cross-sectional shape.

A subframe 136 is of a rectangular shape and supports a not-shown rear wheel of the vehicle. Rear and lower end portions 141 and 142 of the subframe 136 are fastened to the rear subframe mounting portion 134 and front subframe mounting portion 137, respectively, by the subframe 136 being moved upward from below.

The third embodiment of the polygonal cross-sectional frame 11C constructed in the aforementioned manner can achieve the same behavior and advantageous benefits as the first embodiment of the polygonal cross-sectional frame 11.

Further, the third embodiment of the polygonal cross-sectional frame 11C, where the rear polygonal cross-sectional frame member 11c is a straight frame member formed in an "L" closed cross-sectional shape, is less likely to produce a moment that would bend the rear polygonal cross-sectional frame member 11C, than the polygonal cross-sectional frame fixedly joined via the slanting fixed section 96.

Furthermore, because the subframe mounting portion 134 provided at the rear end portion 133 of the front polygonal cross-sectional frame member 131 has an increased mechanical strength and a front portion 144 of the rear polygonal cross-sectional frame member 11c is supported via the subframe mounting portion 134, the third embodiment of the polygonal cross-sectional frame 11C can more readily produce reactive force against the bending moment.

Next, a description will be given about a fourth embodiment of the polygonal cross-sectional frame 11D, with reference to FIG. 13 that is a cross-sectional view similar to FIG. 3. Similar elements to those in the first embodiment of FIGS. 1 to 8 are indicated by the same reference numerals as used for the first embodiment 11 and will not be described here to avoid unnecessary duplication.

Figure 13:
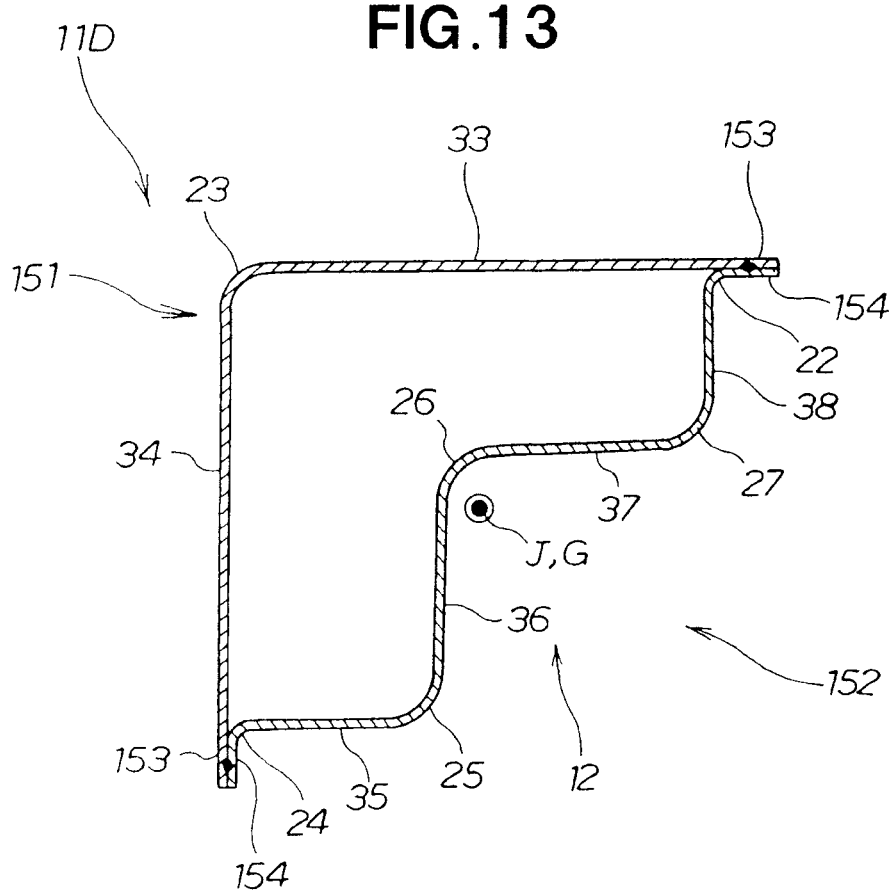
FIG. 13 is a sectional view showing a fourth embodiment of the polygonal cross-sectional frame of the present invention.

As viewed in the cross-sectional view of FIG. 13, the fourth embodiment of the polygonal cross-sectional frame 11D comprises separate first and second frame members (that may be called first and second frame halves) 151 and 152 that are separate from each other parallel to the axis J of the frame 11D and are fixedly joined together in face-to-face opposed relation to each other to thereby together form a hexagonal or generally L closed cross-sectional shape. More specifically, the first frame member 151, which is plastically formed of a steel plate, has first joining flange portions 153 integrally extending from the third side portion 33 and fourth side portion 34. The second frame member 152, which is also plastically formed of a steel plate, has second joining flange portions 154 fixedly joined to the second joining flange portions 153.

The fourth embodiment of the polygonal cross-sectional frame 11D constructed in the aforementioned manner can achieve the same behavior and advantageous benefits as the above-described first embodiment of the polygonal cross-sectional frame 11.

Next, a description will be given about a first embodiment of a rear vehicle body structure of the present invention employed in the vehicle 41.

Figure 14:
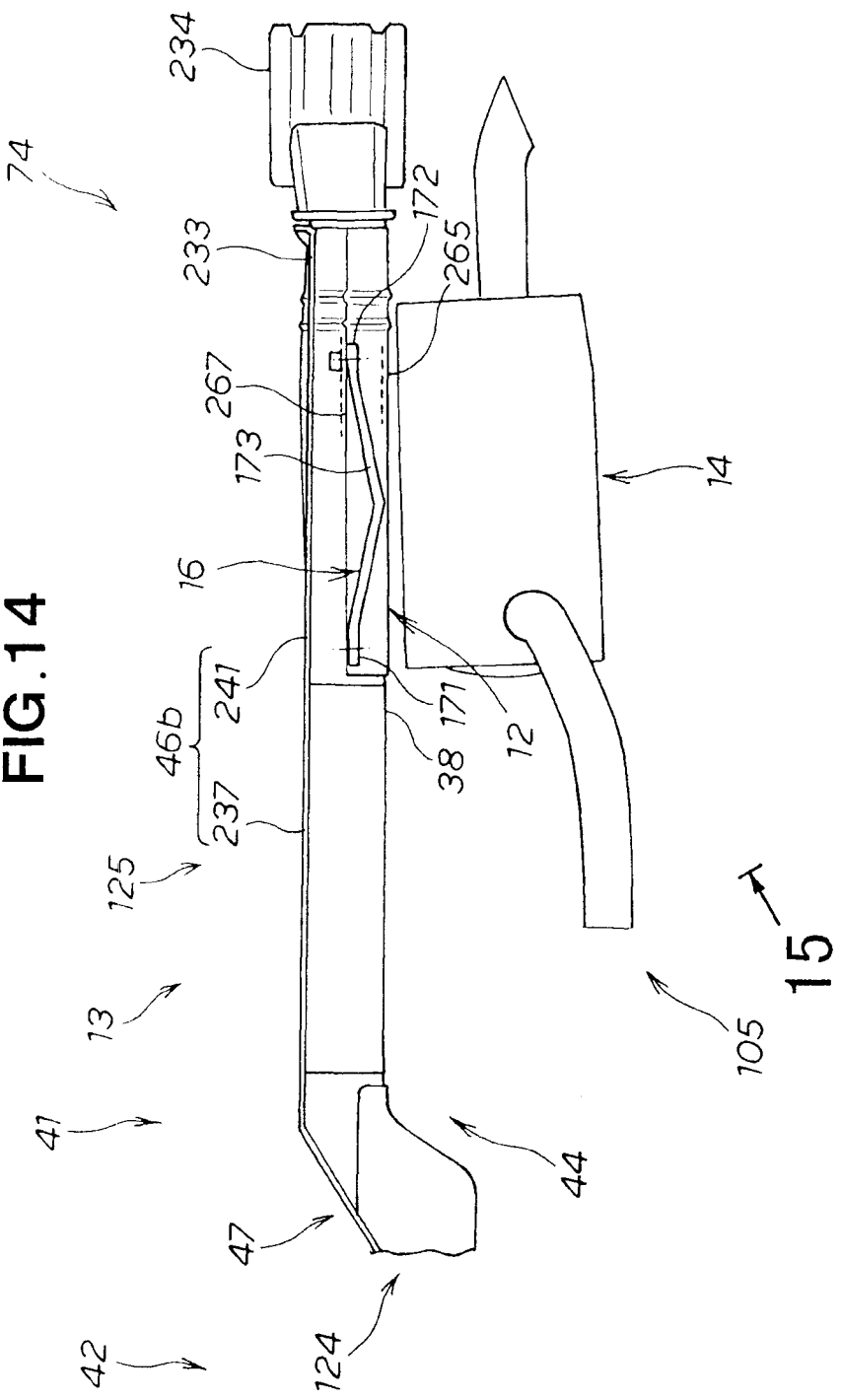
FIG. 14 is a side view showing a first embodiment of a rear vehicle body structure of the present invention.
Figure 15:
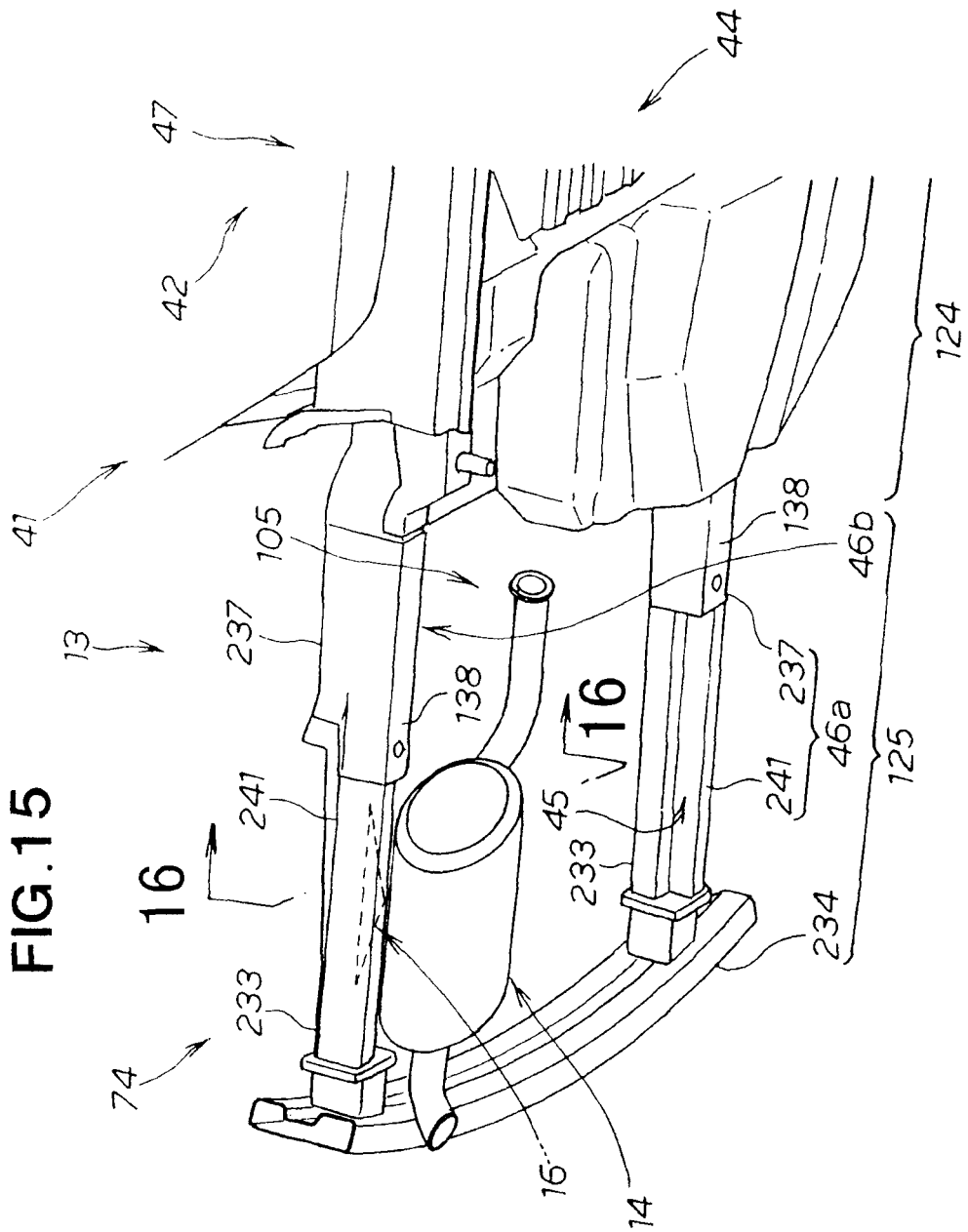
FIG. 15 is a view taken in a direction of arrow 15 of FIG. 14.

As shown in FIGS. 14 and 15, the first embodiment of the rear vehicle body structure employed in the vehicle 41 includes a depressing member 16 provided between a predetermined vehicle-body-mounted component part (in this case, silencer) 14, mounted under the floor of a rear section 13 of the vehicle 41, and the floor (under body) 44 for depressing (pushing down) the vehicle-body-mounted component part (silencer) 14 to prevent the vehicle-body-mounted component part (silencer) 14 from undesirably interfering with another component part, provided in front of the component part (silencer) 14, at the time of a rear collision of the vehicle 41 with an external obstacle or object, such as another vehicle.

In the vehicle body 47, the floor (under body) 44 of the passenger compartment 42 extends to the rear section 13 of the vehicle 41. The under body 44 includes a front under body section 124 and a rear under body section 125 integrally connecting with the front under body section 124.

The rear under body section 125, which is for example the floor of the luggage compartment 74, includes the left and right rear frames 46a and 46b extending rearward from the front under body section 124, and a bumper beam 234 fixed to the rear ends of the left and right rear frames 46a and 46b. The right rear frame 46b, as shown in FIG. 15, includes a front section (hereinafter referred to as "front rear frame section") 237 extending rearward continuously from the front under body section 124, and a rear section (hereinafter referred to as "rear rear frame section") 241 fixed to and extending straightly rearward from a rear end portion 138 of the front rear frame section 247.

The silence of the exhaust pipe 105, i.e. vehicle-body-mounted component part 14, is disposed below the right rear frame 46b. The silencer 14 is of a conventional type having a cylindrical shape, and the silencer 14 is supported by the rear under body section 125 via a not-shown bracket.

Figure 16A:
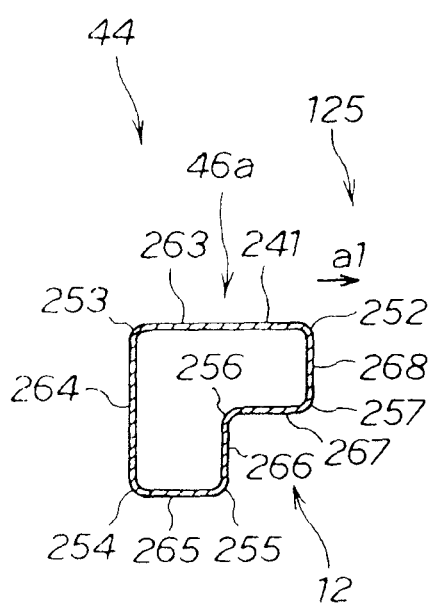
FIGS. 16A and 16B are sectional views taken along the 16-16 line of FIG. 15.
Figure 16B:
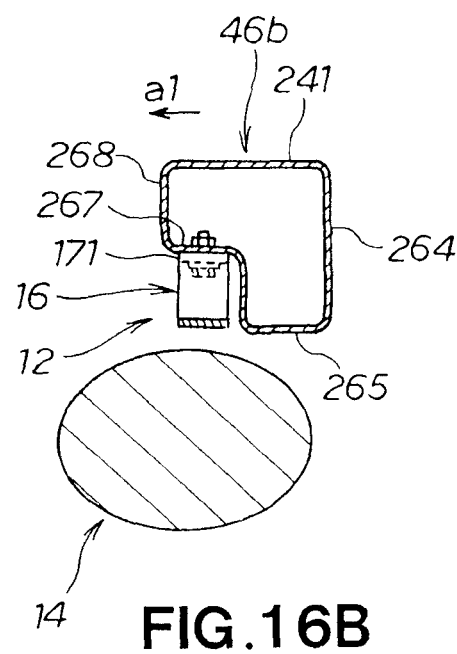

As shown in FIG. 16, the rear rear frame section 241 has a polygonal or hexagonal closed cross-sectional shape (more specifically, L closed cross-sectional shape), and it has an inwardly recessed section 12 that is generally the same as the inwardly recessed section 12 in the above-described first embodiment of the polygonal cross-sectional frame 11 of FIG. 3 and that faces inwardly of the vehicle 41 (as indicated by arrow a1 in FIG. 16).

The rear rear frame section 241 includes second to seventh corner portions 252 to 257, and third and fourth side portions 263 and 264, first unremoved side portion 265, first and second central supporting side portions 266 and 267 and second unremoved side portion 268.

The following describe principal components of the first embodiment of the rear vehicle body structure, with reference to FIGS. 14 to 17. In the first embodiment of the rear vehicle body structure, the depressing member 16 is a member elongated along the lower surface (i.e., first unremoved side portion 265 and second central supporting side portion 267) of the frame section 241 of the rear frame (hereinafter sometimes referred to also as "rear rear frame section 241"), extending rearward from the floor (under body) 44 of the passenger compartment 42, in opposed relation to the vehicle-body-mounted component part (silencer) 14 provided under the depressing member 16.

As the rear rear frame section 241 compressively deforms due to a load input to the rear end of the right rear frame 46b, the depressing member 16 downwardly depresses and displaces the vehicle-body-mounted component part (silencer) 14.

The depressing member 16 is accommodated in the inwardly recessed section 12 in a corner portion defined by the two leg portions of the rear rear frame section 241 of the L cross-sectional shape. The elongated depressing member 16 has front and rear end portions 171 and 172 fixed to the lower surface (second central supporting side portion 267) of the rear rear frame section 241, and an intermediate portion 173 that is formed integrally with and between the front and rear end portions 171 and 172 and that deforms downward toward the vehicle-body-mounted component part (silencer) 14 in response to reduction in a distance X1 between the front and rear end portions 171 and 172.

Now, the depressing member 16 in the first embodiment of the rear vehicle body structure will be described in greater detail, with reference to FIGS. 17A to 17C. FIG. 17A is a plan view of the depressing member 16, FIG. 17B is a front view of the depressing member 16 taken in a direction of arrow b of FIG. 17A, and FIG. 17C is a side view of the depressing member 16 taken in a direction of arrow c of FIG. 17A.

The depressing member 16, which is of a channel cross-sectional shape as seen in FIG. 17C, has the intermediate portion (depression start portion) 173 formed in a V shape integrally with and between the front and rear end portions 171 and 172 as shown in FIG. 17B.

The front and rear end portions 171 and 172 each have a hole 176 for passage therethrough of a bolt 175. Although the front and rear end portions 171 and 172 are shown as fixed to the rear frame 46b by means of the bolts 175, the front and rear end portions 171 and 172 may be welded to the rear frame 46b.

Figure 18:
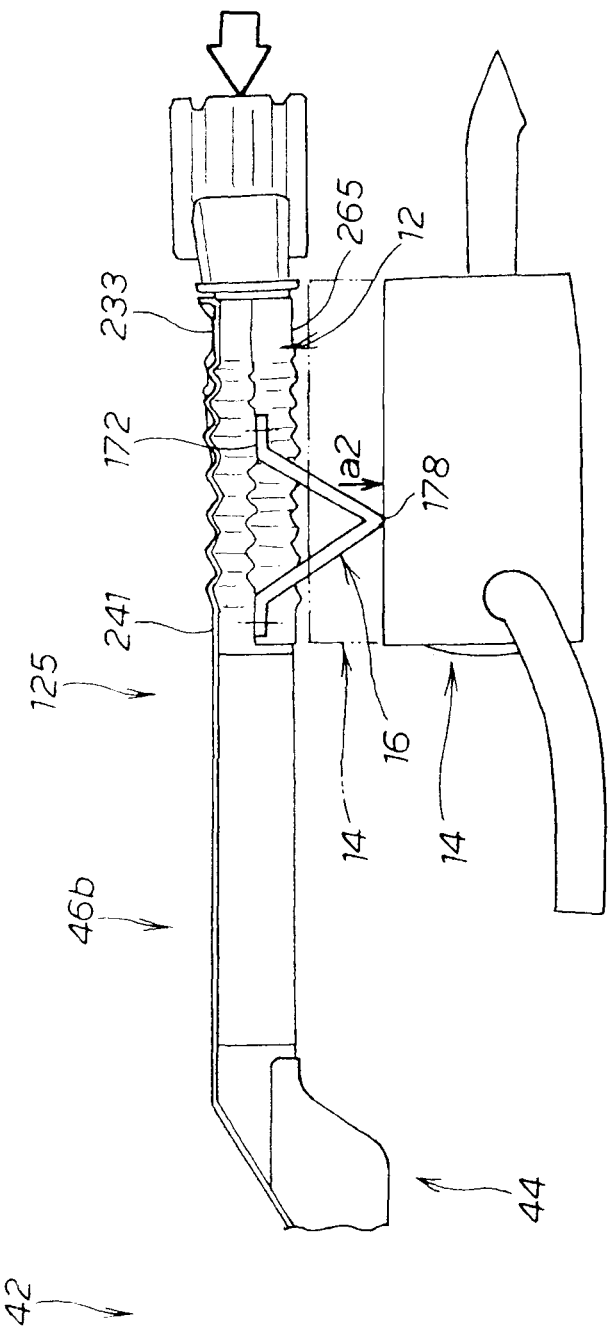
FIG. 18 is a view explanatory of a mechanism for depressing a vehicle-body-mounted component part in the first embodiment of the rear vehicle body structure of the present invention.

The following describe behavior of the first embodiment of the rear vehicle body structure, with primary reference to FIG. 18. As the right rear frame 46b compressively deforms due to a compressive load input thereto, the depressing member 16 bends or deforms downwardly to depress the vehicle-body-mounted component part (silencer) 14 as indicated by arrow a2 of FIG. 17B and FIG. 18.

More specifically, once a compressive load is input to the right rear frame 46b, the right rear frame 46b starts compressively deforming, in response to which the rear end portion 172 of the depressing member 16 starts moving forward. Thus, the load concentrates in a middle corner portion 178 (i.e., stress concentration occurs in the middle corner portion 178) of the V-shaped intermediate portion 173, so that the intermediate portion 173 starts bending at its middle corner portion 178 and thereby starts depressing the vehicle-body-mounted component part (silencer) 14 disposed beneath the intermediate portion 173.

Thus, even where there is only a small space between the lower surface 8 first unremoved side portion 265) of the rear rear frame section 241 and the vehicle-body-mounted component part (silencer) 14, the first embodiment of the rear vehicle body structure advantageously allows the elongated depressing member 16 to be disposed in that small space. Further, the vehicle-body-mounted component part (silencer) 14 can be disposed close to the lower surface (first unremoved side portion 265) of the rear rear frame section 241.

By such depression by the depressing member 16, the vehicle-body-mounted component part 14 can be prevented from undesirably interfering with another component part, such as a front vehicle body and/or fuel tank, disposed in front of the vehicle-body-mounted component part 14. As a result, the first embodiment of the rear vehicle body structure permits further enhancement of impact absorbing performance of the vehicle body. Furthermore, in the case where the vehicle-body-mounted component part is the silence of the exhaust pipe, the depressing member 16 can function also as a member for shielding heat from the silencer.

Next, a description will be given about a second embodiment of the rear vehicle body structure, with reference to FIGS. 19A to 19C. FIG. 19A is a plan view of a depressing member 16B in the second embodiment of the rear vehicle body structure, FIG. 19B is a front view of the depressing member 16B taken in a direction of arrow b of FIG. 19A, and FIG. 19C is a side view of the depressing member 16B taken in a direction of arrow c of FIG. 19a. Similar elements to those in the first embodiment of FIGS. 14 to 18 are indicated by the same reference numerals as used for the first embodiment and will not be described here to avoid unnecessary duplication.

The second embodiment of the rear vehicle body structure is characterized by inclusion of the depressing member 16B which has a frail portion (or easily deformable portion) 182 provided in the upper surface 181 of an intermediate portion 173B in order to facilitate downward bending or deformation, toward the component part 14, of the depressing member 16B, i.e. facilitate depressing operation of the depressing member 16B.

More specifically, the depressing member 16B, which is of a channel cross-sectional shape as seen in FIG. 19C, has the intermediate portion (depression start portion) 173B formed in a straight shape integrally with and between the front and rear end portions 171 and 172 as shown in FIG. 19B. The frail portion 182 is provided in a longitudinally-middle region of the upper surface 181 of an intermediate portion 173B. The frail portion 182 is in the form of a groove of an accurately concave (or C) sectional shape or a V sectional shape.

The front and rear end portions 171 and 172 each have the hole 176 for passage therethrough of the bolt 175. Although the front and rear end portions 171 and 172 are shown as fixed to the rear frame 46*b* by means of the bolts 175, the front and rear end portions 171 and 172 may be welded to the rear frame 46*b*.

The second embodiment of the rear vehicle body structure constructed in the aforementioned manner can achieve the same behavior and advantageous benefits as the above-described first embodiment of the rear vehicle body structure. Further, with the frail portion 182 provided in the intermediate portion 173B, the depressing member 16B can be reliably bent downward at the frail portion 182 of the intermediate portion 173B. Because it is only necessary to form the frail portion 182 in the intermediate portion 173B, the second embodiment of the rear vehicle body structure can be constructed in a simplified manner.

Figure 20A:
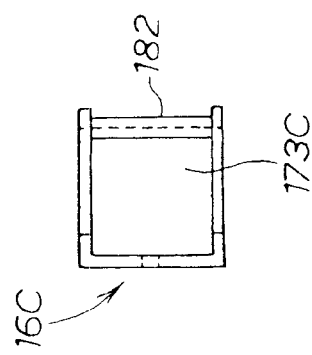
FIGS. 20A, 20B and 20C are plan, front and side views, respectively, of a depressing member employed in a third embodiment of the rear vehicle body structure of the present invention.
Figure 20B:
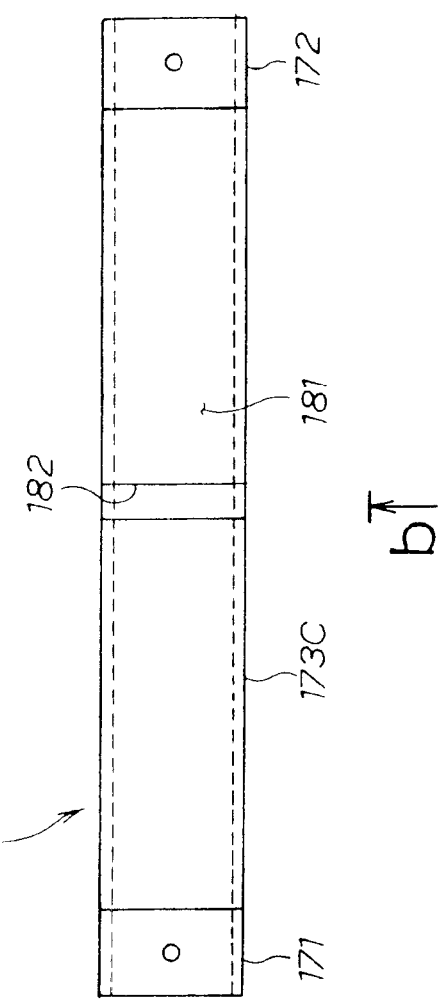
Figure 20C:
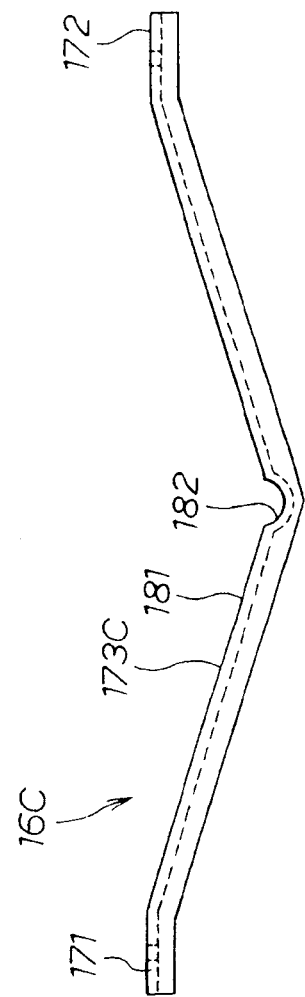

Next, a description will be given about a third embodiment of the rear vehicle body structure, with reference to FIGS. 20A to 20C. FIG. 20A is a plan view of a depressing member 16C in the third embodiment of the rear vehicle body structure, FIG. 20B is a front view of the depressing member 16C taken in a direction of arrow b of FIG. 20A, and FIG. 20C is a side view of the depressing member 16C taken in a direction of arrow c of FIG. 20A. Similar elements to those in the first and second embodiments of FIGS. 14 to 19 are indicated by the same reference numerals as used for the first and second embodiments and will not be described here to avoid unnecessary duplication. The third embodiment of the rear vehicle body structure is characterized by inclusion of the depressing member 16C that has an intermediate portion (depression start portion) 173C formed in a V shape integrally with and between the front and rear end portions 171 and 172 as shown in FIG. 20B. The frail portion 182 is provided in a longitudinally-middle region of the upper surface 181 of the intermediate portion 173C, in order to facilitate downward bending or deformation, toward the component part 14, of the depressing member 16C, i.e. facilitate depressing operation of the depressing member 16C.

More specifically, the depressing member 16C, which is of a channel cross-sectional shape as seen in FIG. 20C, has the intermediate portion (depression start portion) 173C formed integrally with and between the front and rear end portions 171 and 172 as shown in FIG. 20B. The frail portion 182 is in the form of a groove of an accurate (or generally C) sectional shape or a V sectional shape.

The third embodiment of the rear vehicle body structure constructed in the aforementioned manner can achieve the same behavior and advantageous benefits as the above-described first embodiment of the rear vehicle body structure. With the frail portion 182 provided in the intermediate portion 173C, the depressing member 16C can be reliably bent down ward at frail portion 182 of the intermediate portion 173C.

Next, a description will be given about a fourth embodiment of the rear vehicle body structure, with reference to FIGS. 21A to 21C. FIG. 21A is a plan view of a depressing member 16D in the fourth embodiment of the rear vehicle body structure, FIG. 21B is a front view taken of the depressing member 16D in a direction of arrow b of FIG. 21A, and FIG. 21C is a side view of the depressing member 16D taken in a direction of arrow c of FIG. 21A. Similar elements to those in the first, second and third embodiments of FIGS. 14 to 20 are indicated by the same reference numerals as used for the first, second and third embodiments and will not be described here to avoid unnecessary duplication.

The fourth embodiment of the rear vehicle body structure is characterized by inclusion of the depressing member 16D that has a rectangular closed cross-sectional shape, and that has an intermediate portion (depression start portion) 173D formed in a V shape integrally with and between front and rear end portions 171D and 172D as shown in FIG. 21B.

The front and rear end portions 171D and 172D each have the hole 176 for passage therethrough of the bolt 175, and a second hole 191 for receiving the head of the bolt 175. Although the front and rear end portions 171D and 172D are shown as fixed to the rear frame 46*b* by means of the bolt 175, the front and rear end portions 171D and 172D may be welded to the rear frame 46*b*.

The fourth embodiment of the rear vehicle body structure constructed in the aforementioned manner can achieve the same behavior and advantageous benefits as the above-described first embodiment of the rear vehicle body structure.

Next, a description will be given about a fifth embodiment of the rear vehicle body structure, with reference to FIGS. 22A to 22C. FIG. 22A is a plan view of a depressing member 16E in the fifth embodiment of the rear vehicle body structure, FIG. 22B is a front view of the depressing member 16E taken in a direction of arrow b of FIG. 22A, and FIG. 22C is a side view of the depressing member 16E taken in a direction of arrow c of FIG. 22A. Similar elements to those in the first, second, third and fourth embodiments of FIGS. 14 to 21 are indicated by the same reference numerals as used for the first, second, third and fourth embodiments and will not be described here to avoid unnecessary duplication.

The fifth embodiment of the rear vehicle body structure is characterized by inclusion of the depressing member 16E that has an intermediate portion (depression start portion) 173E formed in a V shape integrally with and between the front and rear end portions 171D and 172D as shown in FIG. 22B, and that has the frail portion 182, similar to the one 182 in the third embodiment shown in FIG. 20, provided in a longitudinally—middle region of the intermediate portion 173E.

The fifth embodiment of the rear vehicle body structure constructed in the aforementioned manner can achieve the same behavior and advantageous benefits as the above-described first and third embodiments of the rear vehicle body structure.

Whereas the intermediate portion (depression start portion) 173E of the fifth embodiment of the rear vehicle body structure has been shown and described as formed in a V shape, it may be formed in a straight shape with the frail portion 182 formed in its straight upper surface. In such a case, the fifth embodiment of the rear vehicle body structure constructed in the aforementioned manner can achieve the same behavior and advantageous benefits as the first and second embodiments of the rear vehicle body structure, and the fifth embodiment of the rear vehicle body structure can also be constructed in a simplified manner because it is only necessary to form the frail portion 182 in the upper surface of the intermediate portion 173E.

Next, a description will be given about a sixth embodiment of the rear vehicle body structure, with reference to FIGS. 23A to 23C. FIG. 23A is a plan view of a depressing member 16F in the sixth embodiment of the rear vehicle body structure, FIG. 23B is a front view of the depressing member 16F taken in a direction of arrow b of FIG. 23A, and FIG. 23C is a side view of the depressing member 16F taken in a direction of arrow c of FIG. 23A. Similar elements to those in the first embodiment of FIGS. 14 to 18 are indicated by the same reference numerals as used for the first embodiment and will not be described here to avoid unnecessary duplication.

The sixth embodiment of the rear vehicle body structure is characterized by inclusion of the depressing member 16F that is of a channel cross-sectional shape and has an intermediate portion (depression start portion) 173F formed in a W shape integrally with and between the front and rear end portions 171 and 172 as shown in FIG. 23B.

In the depressing member 16F, the intermediate portion 173F includes a first depression start portion 102 formed in a V shape integrally with and between the front end portion 171 and a longitudinally middle portion 111, and a second depression start portion 113 formed in a V shape integrally with and between the rear end portion 172 and the longitudinally middle portion 111.

The sixth embodiment of the rear vehicle body structure constructed in the aforementioned manner can achieve the same behavior and advantageous benefits as the above-described first embodiment of the rear vehicle body structure.

In the sixth embodiment of the rear vehicle body structure, the depressing member 16F starts bending downward at respective corner portions 278 of the first and second depression start portions 102 and 114 to depress the vehicle-body-mounted component part (silencer) 14. As a consequence, the vehicle-body-mounted component part (silencer) 14 can be depressed and displaced while being kept in a substantially horizontal posture and while more reliably avoiding undesired interference with another component part, such as a fuel tank, disposed in front of the vehicle-body-mounted component part (silencer) 14. As a result, the sixth embodiment of the rear vehicle body structure permits further enhancement of impact absorbing performance of the vehicle body.

Figure 24C:
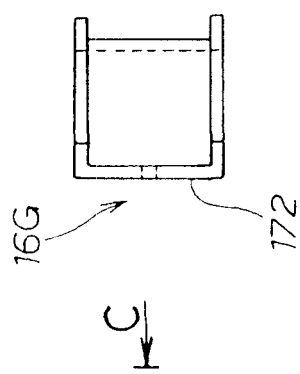
FIGS. 24A, 24B and 24C are plan, front and side views, respectively, of a depressing member employed in a seventh embodiment of the rear vehicle body structure of the present invention.
Figure 24A:
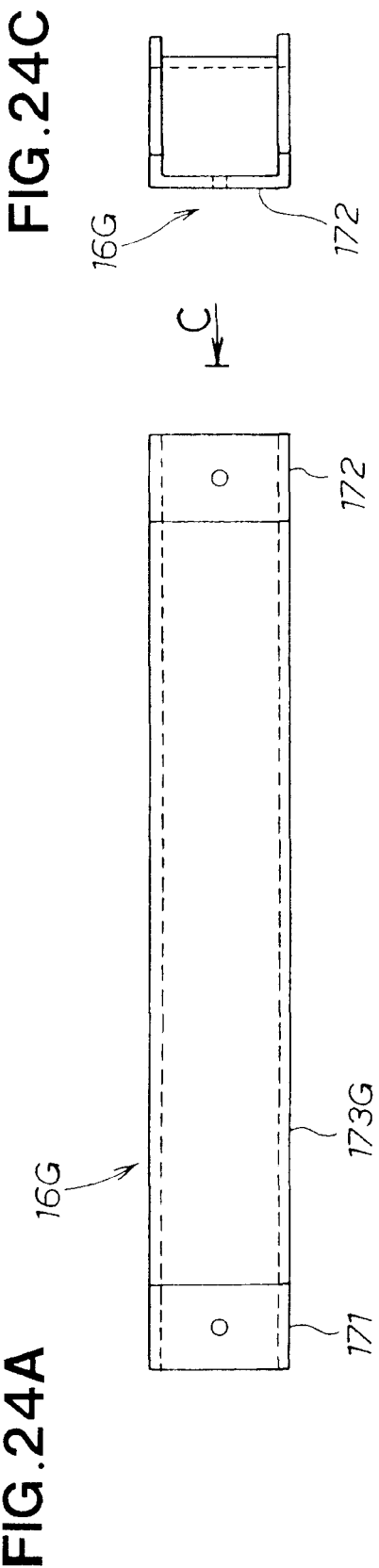
Figure 24B:
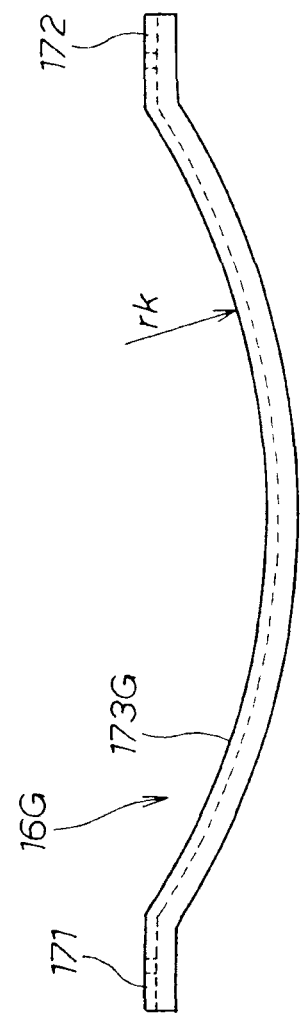

Next, a description will be given about a seventh embodiment of the rear vehicle body structure, with reference to FIGS. 24A to 24C. FIG. 24A is a plan view of a depressing member 16G in the seventh embodiment of the rear vehicle body structure, FIG. 24B is a front view of the depressing member 16G vehicle body structure, FIG. 24B is a front view of the depressing member 16G taken in a direction of arrow b of FIG. 24A, and FIG. 24C is a side view of the depressing member 16G taken in a direction of arrow c of FIG. 24A. Similar elements to those in the first embodiment of FIGS. 14 to 18 are indicated by the same reference numerals as used for the first embodiment and will not be described here to avoid unnecessary duplication.

The seventh embodiment of the rear vehicle body structure is characterized by inclusion of the depressing member 16G that has a channel cross-sectional shape and has an intermediate portion (depression start portion) 173G formed integrally with and between the front and rear end portions 171 and 172 as shown in FIG. 24B. The intermediate portion 173G is downwardly accurately curved at a radius rk toward the vehicle-body-mounted component part (silencer) 14, as shown in FIG. 24B.

The seventh embodiment of the rear vehicle body structure constructed in the aforementioned manner can achieve the same behavior and advantageous benefits as the above-described first embodiment of the rear vehicle body structure.

Figure 25:
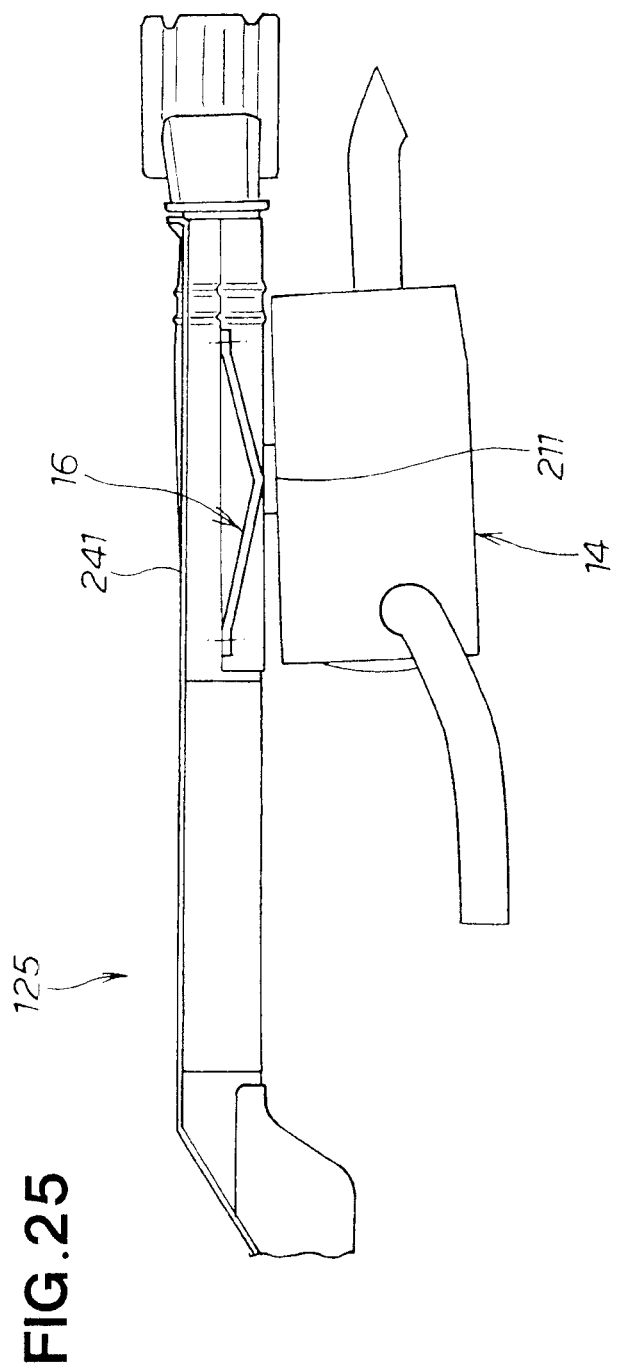
FIG. 25 is a side view of an eighth embodiment of the rear vehicle body structure of the present invention.

Next, a description will be given about an eighth embodiment of the rear vehicle body structure, with reference to FIG. 25. FIG. 25, which is similar to FIG. 14, is a side view of the depressing member 16 in the eight embodiment of the rear vehicle body structure. Similar elements to those in the first embodiment of FIGS. 14 to 18 are indicated by the same reference numerals as used for the first embodiment and will not describe here to avoid unnecessary duplication.

The eighth embodiment of the rear vehicle body structure is characterized in that an upward protruding portion 211 is provided on the vehicle-body-mounted component part (silencer) 14 in opposed relation to a longitudinally-middle portion of the depressing member 16 constructed in the same manner as the depressing member 16 of the first embodiment. The upward protruding portion 211 may be formed in any desired shape and any desired height.

The eighth embodiment of the rear vehicle body structure constructed in the aforementioned manner can achieve the same behavior and advantageous benefits as the above-described first embodiment of the rear vehicle body structure. Further, the eight embodiment of the rear vehicle body structure can increase the amount of depression by the depressing member 16 as compared to the counterpart (e.g., the first embodiment of the rear vehicle body structure) where no upward protruding portion is provided on the vehicle-body-mounted component part (silencer).

Figure 26:
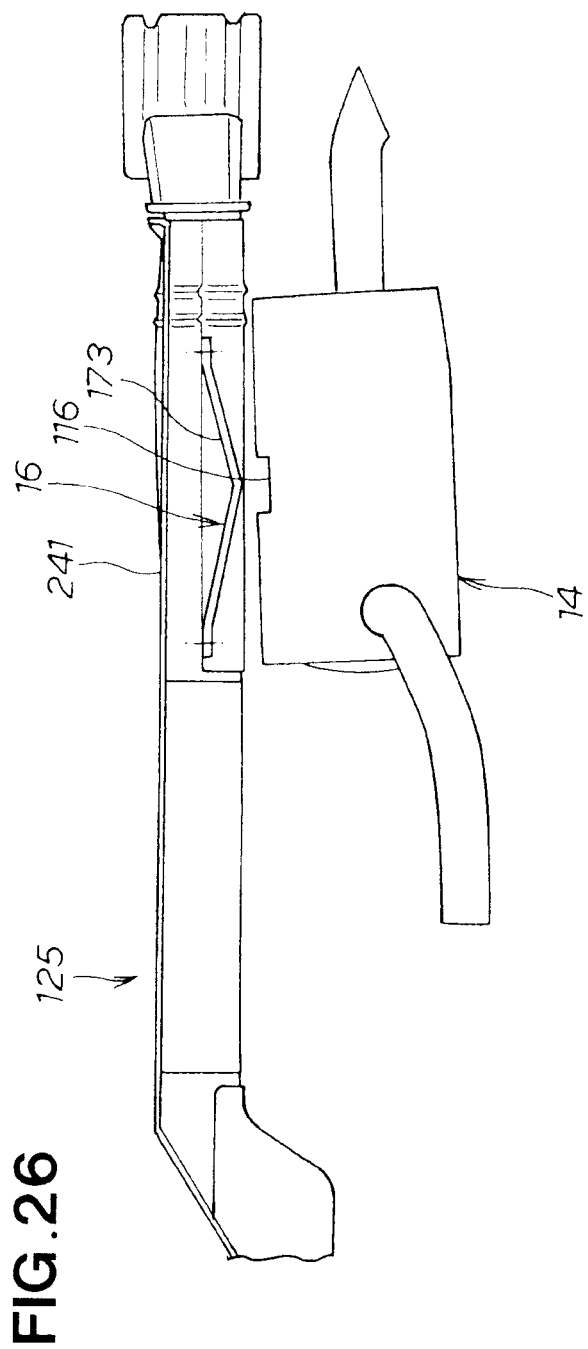
FIG. 26 is a side view of a ninth embodiment of the rear vehicle body structure of the present invention.

Next, a description will be given about a ninth embodiment of the rear vehicle body structure, with reference to FIG. 26. FIG. 26, which is similar to FIG. 14, is a side view of the ninth embodiment of the rear vehicle body structure. Similar elements to those in the first embodiment of FIGS. 14 to 18 are indicated by the same reference numerals as used for the first embodiment and will not be described here to avoid unnecessary duplication.

The ninth embodiment of the rear vehicle body structure is characterized in that a downward recess 116 is provided in the vehicle-body-mounted component part (silencer) 14 in opposed relation to a longitudinally-middle portion of the depressing member 16 constructed in the same manner as the depressing member 16 of the first embodiment. The downward recess 116 has a size to permit entry therein of a lower end corner region of the intermediate portion 173 of the depressing member 16.

The ninth embodiment of the rear vehicle body structure constructed in the aforementioned manner can achieve the same behavior and advantageous benefits as the above-described first embodiment of the rear vehicle body structure. Further, because the lower end corner region of the depressing member 16 enters the downward recess 116 of the vehicle-body-mounted component part (silencer) 14, it is possible to designate or establish a position at which the depressing member 16 should depress the vehicle-body-mounted component part (silencer) 14.

Figure 27:
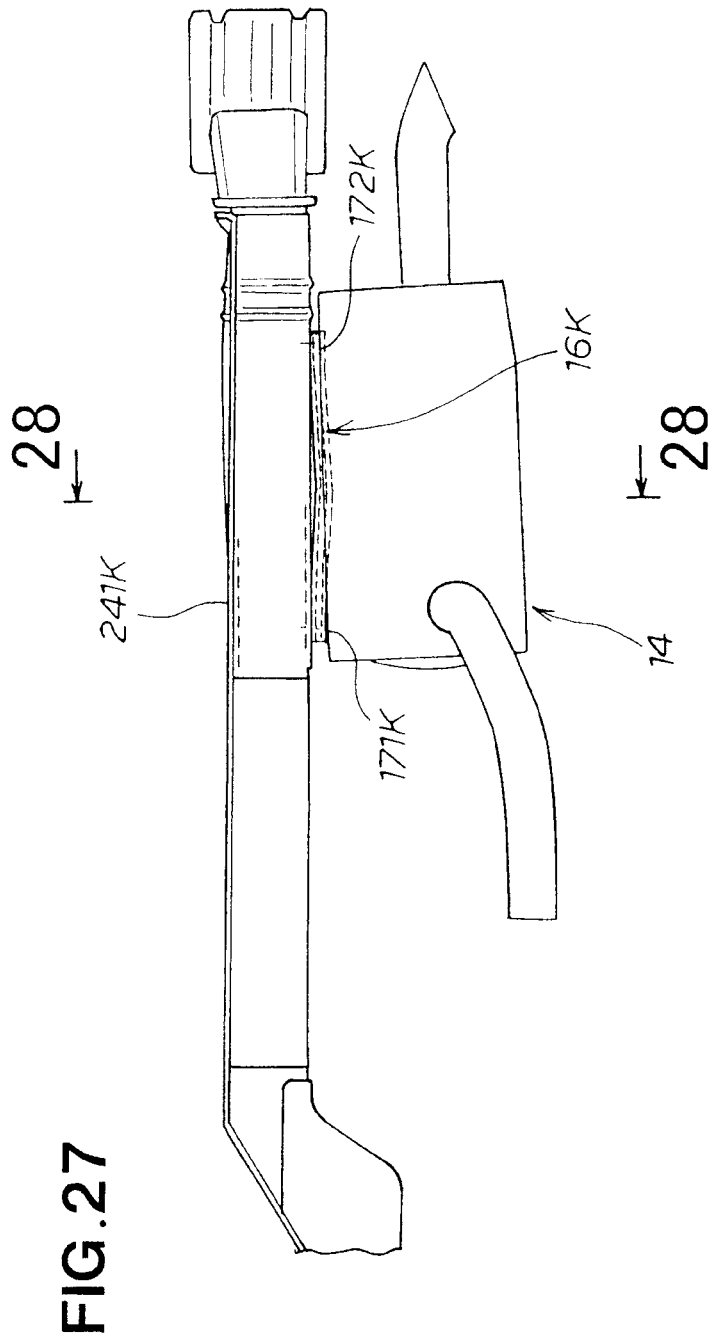
FIG. 27 is a side view of a tenth embodiment of the rear vehicle body structure of the present invention.
Figure 28A:
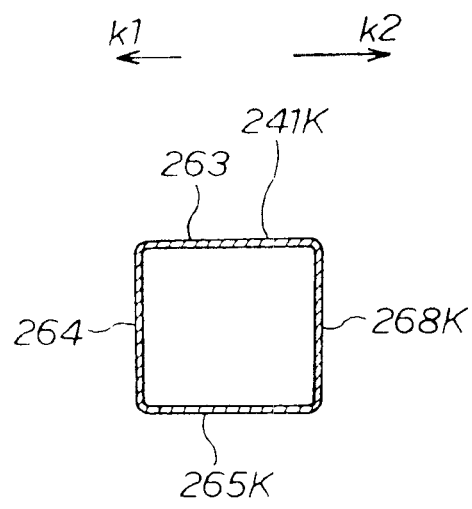
FIGS. 28A and 28B are sectional views taken along the 28-28 line of FIG. 27.

Next, a description will be given about a tenth embodiment of the rear vehicle body structure, with reference to FIGS. 27 to 29. FIG. 27 is a view similar to FIG. 14, and FIG. 28 is a view similar to FIG. 16. FIG. 29A is a plan view of a depressing member 16K in the tenth embodiment of the rear vehicle body structure, FIG. 29B is a front view of the depressing member 16K taken in a direction of arrow b of FIG. 29A, and FIG. 29C is a side view of the depressing member 16K taken in a direction of arrow c of FIG. 29A. Similar elements to those in the above-described first embodiment of FIGS. 14 to 18 are indicated by the same reference numerals as used for the first embodiment and will not be described here to avoid unnecessary duplication.

The tenth embodiment of the rear vehicle body structure is characterized by inclusion of a rear frame section 241K and the depressing member 16K. The rear rear frame section 241K is of a rectangular or substantially square cross-sectional shape.

The depressing member 16K, which has an elongated shape, has front and rear end portions 171K and 172K formed on an upper surface portion 122 and slanting surface portion 121 and fixed to the lower surface 265K of the rear rear frame section 241K, and an intermediate portion (depression start portion) 173K that is formed in a V shape integrally with and between the front and rear end portions 171K and 172K as shown in FIGS. 27 and 29B and that deforms downward toward the vehicle-body-mounted component part (silencer) 14 in response to reduction in the distance between the front and rear end portions 171K and 172K.

Figure 28B:
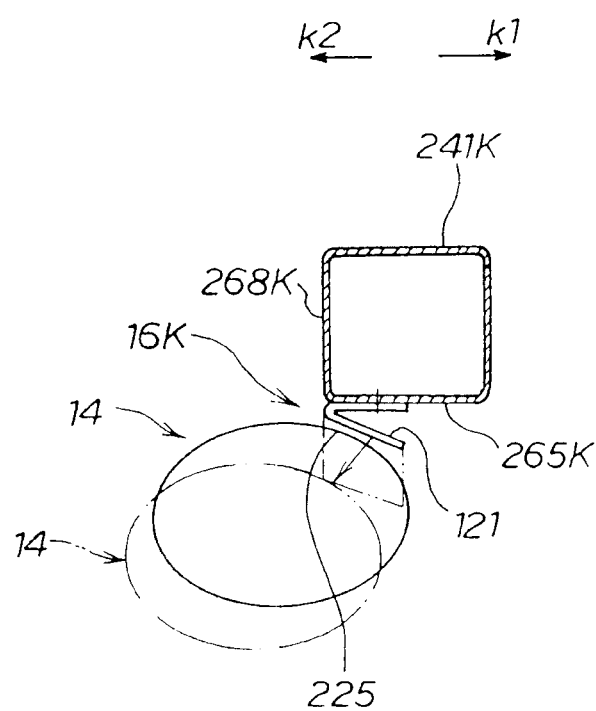

As shown in FIG. 28B, the depressing member 16K has the belt-shaped slanting surface portion 121 oriented to face outwardly of the rear rear frame section 241K (i.e., in a direction of arrow k1) or inwardly of the rear rear frame section 241K (i.e., in a direction of arrow k2). In the illustrated example, the slanting surface portion 121 is oriented to face inwardly and downwardly of the rear rear frame section 241K; namely, the slanting surface portion 121 is oriented to face toward an upper outer surface portion 225 of the vehicle-body-mounted component part (silencer) 14.

More specifically, as seen in FIGS. 29A to 29C, the depressing member 16K has a V cross-sectional shape when viewed perpendicularly to the axis AC, and it has the belt-shaped upper surface portion 122 opposed to the rear rear frame section 241K. The slanting surface portion 121 extends integrally from the upper surface portion 122 via an edge portion 123 and defines a given angle a with the upper surface portion 122.

Whereas the vehicle-body-mounted component part (silencer) 14 is shown as disposed more inwardly of the vehicle 41 (i.e., more inwardly in the direction of arrow k2) than the rear rear frame section 241K, the vehicle-body-mounted component part (silencer) 14 may be dispose more outwardly of the vehicle 41, namely the passenger compartment 42, (i.e., more outwardly in the direction of arrow k1) than the rear rear frame section 241K, in which case the slanting surface portion 121 is of course, oriented to face outwardly of the vehicle 41, i.e. away from the passenger compartment 42.

Further, the frail portion 182 may be provided in a longitudinally-middle region in the intermediate portion 173K in the same manner as in the depressing member 16C of the third embodiment. Further, whereas the intermediate portion 173K is shown as formed in a V shape, it may be formed in a straight shape in the same manner as the intermediate portion 173B of the depressing member 16B of the second embodiment.

The tenth embodiment of the rear vehicle body structure constructed in the aforementioned manner can achieve the same behavior and advantageous benefits as the above-described first embodiment of the rear vehicle body structure.

More specifically, as the rear frame 46b compressively deforms due to a compressive load input thereto, the rear end portion 172K of the depressing member 16K starts moving forward, and the intermediate portion 173K starts bending downward at a corner portion 126. Because the slanting surface portion 121 depresses the upper outer surface portion 225 of the vehicle-body-mounted component part (silencer) 14 at that time, the vehicle-body-mounted component part (silencer) 14 is depressed and displaced inwardly and downwardly of the vehicle 41 as indicated by two-dot-dash line in FIG. 28B Because the vehicle-body-mounted component part (silencer) 14 is depressed inwardly and downwardly of the vehicle 41 as noted above, the tenth embodiment of the rear vehicle body structure can more reliably prevent the vehicle-body-mounted component part (silencer) 14 from undesirably interfering with another component part, such as the fuel tank, disposed in front of the vehicle-body-mounted component part (silencer) 14.

Next, a description will be given about an eleventh embodiment of the rear vehicle body structure, with reference to FIGS. 30A to 30C. FIG. 30A is a plan view of a depressing member 16L in the eleventh embodiment of the rear vehicle body structure, FIG. 30B is a front view of the depressing member 16L taken in a direction of arrow b of FIG. 30A, and FIG. 30C is a side view of the depressing member 16L taken in a direction of arrow c of FIG. 30A. Similar elements to those in the above-described first embodiment of FIGS. 14 to 18 and tenth embodiment of FIGS. 27 to 29 are indicated by the same reference numerals as used for the first and tenth embodiments and will not be described here to avoid unnecessary duplication.

The eleventh embodiment of the rear vehicle body structure is characterized by inclusion of the depressing member 16L. The depressing member 16L has an intermediate portion 173L, and a slanting surface portion 121L oriented to face outwardly or inwardly of the rear rear frame section 241K.

The intermediate portion 173L is downwardly accurately curved toward the vehicle-body-mounted component part (silencer) 14 at a radius rk, as shown in FIG. 30B.

The eleventh embodiment of the rear vehicle body structure constructed in the aforementioned manner can achieve the same behavior and advantageous benefits as the above-described tenth embodiment of the rear vehicle body structure.

The above-described polygonal cross-sectional frame of the present invention is well suited for use as front side frames and rear frames of vehicles, and the above-described rear vehicle body structure of the present invention is well suited for application to vehicles where a component part, such as a silencer, is disposed under a floor of a rear section of the vehicle body.

What is claimed is:

1. A polygonal cross-sectional frame for a vehicle, said polygonal cross-sectional frame having a hexagonal closed cross-sectional shape,
    the hexagonal closed cross-sectional shape of the frame being an L closed cross-sectional shape such that the frame has an inwardly recessed section in a corner portion between two leg portions of the L closed cross-sectional shape;
    said polygonal cross-sectional frame extending in a length direction of the vehicle so as to extend generally parallel to, but inwardly and rearwardly spaced from, side sills of the vehicle;
    wherein the inwardly recessed portion of said polygonal cross-sectional frame faces inwardly in a vehicle width-direction and downwardly relative to the vehicle;
    wherein the inwardly recessed section is defined by first and second side portions; a first central supporting side portion extending continuously from the first side portion to an inner end disposed generally midway along a line interconnecting opposite corners of said first and second side portions; and a second central supporting side portion extending continuously from the second side portion to an inner end of the first central supporting side portion;
    wherein a forward end of said polygonal cross-sectional frame extends to a front side frame extending forward from a floor of a passenger compartment of a vehicle, said polygonal cross-sectional frame being part of a rear frame extending rearward from the floor of the passenger compartment.

2. The polygonal cross-sectional frame according to claim 1, wherein, where the polygonal cross-sectional frame is disposed substantially horizontally, one of the first central supporting side portion and the second central supporting side portion extends vertically while other of the first central supporting side portion and the second central supporting side portion extends horizontally.

3. The polygonal cross-sectional frame according to claim 1, wherein the second central supporting side portion intersects perpendicularly with the first central supporting side portion.

4. The polygonal cross-sectional frame according to claim 1, which is used in a vehicle as a rear polygonal cross-sectional frame member that extends straight to be connected to a subframe mounting portion provided at a rear end portion of a front frame member extending rearward from a floor of a passenger compartment of a vehicle.

5. The polygonal cross-sectional frame according to claim 1, wherein the polygonal cross-sectional frame is set at a height higher than the floor and is adapted for connection to an other frame that extends downward from a roof rail, said other frame defining one of left and right end edges of a roof of the passenger compartment, wherein a lower end of said other frame is fixedly to an upper portion of the polygonal cross-sectional frame.

* * * * *